US012379635B2

United States Patent
Tai et al.

(10) Patent No.: US 12,379,635 B2
(45) Date of Patent: Aug. 5, 2025

(54) ELECTRONIC DEVICE

(71) Applicant: InnoLux Corporation, Miao-Li County (TW)

(72) Inventors: Ming-Jou Tai, Miao-Li County (TW); Chia-Hao Tsai, Miao-Li County (TW); Yi-Shiuan Cherng, Miao-Li County (TW); You-Cheng Lu, Miao-Li County (TW); Wei-Yen Chiu, Miao-Li County (TW); Yung-Hsun Wu, Miao-Li County (TW)

(73) Assignee: InnoLux Corporation, Miao-Li County (TW)

( * ) Notice: Subject to any disclaimer, the term of this patent is extended or adjusted under 35 U.S.C. 154(b) by 99 days.

(21) Appl. No.: 18/127,641

(22) Filed: Mar. 28, 2023

(65) Prior Publication Data

US 2023/0324748 A1    Oct. 12, 2023

Related U.S. Application Data

(60) Provisional application No. 63/329,896, filed on Apr. 12, 2022.

(30) Foreign Application Priority Data

Jan. 5, 2023   (CN) .......................... 202310011886.9

(51) Int. Cl.
*G02F 1/1362*    (2006.01)
*G02F 1/1368*    (2006.01)
*G06F 3/01*      (2006.01)

(52) U.S. Cl.
CPC .. *G02F 1/136286* (2013.01); *G02F 1/136222* (2021.01); *G02F 1/136227* (2013.01); *G02F 1/1368* (2013.01); *G06F 3/011* (2013.01)

(58) Field of Classification Search
CPC ......... G02F 1/136286; G02F 1/136222; G02F 1/136227; G02F 1/1368; G06F 3/011
USPC .......................................................... 349/33
See application file for complete search history.

(56) References Cited

U.S. PATENT DOCUMENTS

| | | | |
|---|---|---|---|
| 10,824,027 B2 | 11/2020 | Chuang | |
| 2007/0165179 A1 | 7/2007 | Jang | |
| 2017/0097538 A1* | 4/2017 | Cho | ..................... H10K 59/121 |
| 2019/0196242 A1* | 6/2019 | Nomura | ................ G02F 1/1368 |
| 2020/0271987 A1 | 8/2020 | Park | |
| 2021/0302775 A1* | 9/2021 | Adachi | ............. G02F 1/136286 |

FOREIGN PATENT DOCUMENTS

| | | |
|---|---|---|
| CN | 104849919 A | 8/2015 |
| CN | 106918967 A | 7/2017 |
| CN | 107272268 A | 10/2017 |
| CN | 110275336 A | 9/2019 |
| TW | 201337404 A | 9/2013 |

\* cited by examiner

*Primary Examiner* — Michael H Caley
*Assistant Examiner* — William D Peterson
(74) *Attorney, Agent, or Firm* — Winston Hsu

(57) ABSTRACT

An electronic device has a plurality of sub-pixels. The electronic device includes a substrate, a gate line and a spacer. The gate line is disposed on the substrate and extends along a first direction. The spacer is disposed on the gate line and overlaps with the gate line. The spacer has a first width W1 along the first direction. One of the plurality of sub-pixels has a sub-pixel pitch P along the first direction. The first width W1 and the sub-pixel pitch P satisfy the following relationship: $P \leq W1$.

18 Claims, 17 Drawing Sheets

ELECTRONIC DEVICE

CROSS REFERENCE TO RELATED APPLICATION

This application claims the benefit of U.S. Provisional Application No. 63/329,896, filed on Apr. 12, 2022. The content of the application is incorporated herein by reference.

BACKGROUND OF THE DISCLOSURE

1. Field of the Disclosure

The present disclosure relates to an electronic device, and more particularly, to an electronic device with high resolution.

2. Description of the Prior Art

With the advancement of technology, electronic devices equipped with displays have become indispensable in modern life. However, the electronic devices have not yet met expectations in all aspects. With the enhancement of resolution and the reduction of pixel areas how to improve the resolution and the process yield of the electronic devices is still one of the goals of the industry, such as improving the offset when assembling the upper and lower panels, or phenomena of scratching the alignment film caused by the spacer, alignment film halo, poor alignment around the spacer when applied to liquid crystal display devices.

SUMMARY OF THE DISCLOSURE

According to an embodiment of the present disclosure, an electronic device has a plurality of sub-pixels. The electronic device includes a substrate, a gate line and a spacer. The gate line is disposed on the substrate and extends along a first direction. The spacer is disposed on the gate line and overlaps with the gate line. The spacer has a first width W1 along the first direction. One of the plurality of sub-pixels has a sub-pixel pitch P along the first direction. The first width W1 and the sub-pixel pitch P satisfy the following relationship: P≤W1.

According to another embodiment of the present disclosure, an electronic device includes a substrate, a data line, an opposite substrate, a spacer and a first pattern. The data line is disposed on the substrate and has an extending direction. The opposite substrate is disposed corresponding to the substrate. The spacer is disposed between the substrate and the opposite substrate. The first pattern is disposed between the data line and the spacer and extends along the extending direction. The first pattern overlaps with the data line.

These and other objectives of the present disclosure will no doubt become obvious to those of ordinary skill in the art after reading the following detailed description of the embodiment that is illustrated in the various figures and drawings.

DETAILED DESCRIPTION

Figure 1:
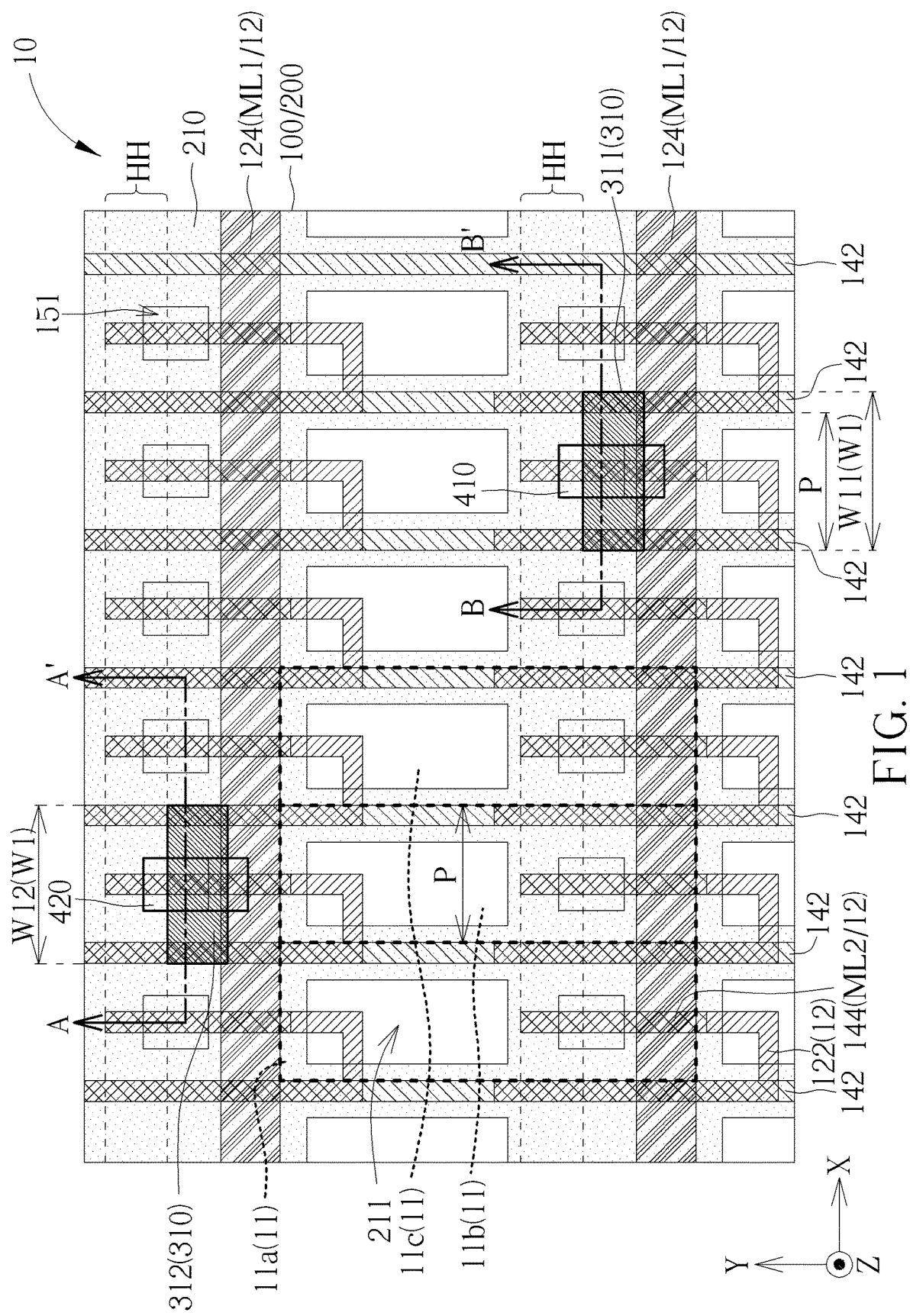
FIG. 1 is a schematic diagram showing a top view of an electronic device according to an embodiment of the present disclosure.

The present disclosure may be understood by reference to the following detailed description, taken in conjunction with the drawings as described below. Wherever possible, the same or similar parts in the drawings and descriptions are represented by the same reference numeral.

Certain terms are used throughout the description and following claims to refer to particular components. As one skilled in the art will understand, electronic equipment manufacturers may refer to a component by different names. This document does not intend to distinguish between components that differ in name but not function. In the following description and in the claims, the terms "include/comprise" and "have" are used in an open-ended fashion, and thus should be interpreted to mean "include, but not limited to . . .".

In the present disclosure, the directional terms, such as "on/up/above", "down/below", "front", "rear/back", "left", "right", etc., are only directions referring to the drawings. Therefore, the directional terms are used for explaining and not used for limiting the present disclosure. Regarding the drawings, the drawings show the general characteristics of methods, structures, and/or materials used in specific embodiments. However, the drawings should not be construed as defining or limiting the scope or properties encompassed by these embodiments. For example, for clarity, the relative size, thickness, and position of each layer, each area, and/or each structure may be reduced or enlarged.

In the present disclosure, when, a structure (or layer, or component, or substrate) is described as located on/above another structure (or layer, or component, or substrate), it may refer that the two structures are adjacent and directly connected with each other, or the two structures are adjacent and indirectly connected with each other. The two structures being indirectly connected with each other may refer that at least one intervening structure (or intervening layer, or intervening components or intervening substrate, or intervening interval) exists between the two structures, a lower surface of one of the two structure is adjacent or directly connected with an upper surface of the intervening structure, and an upper surface of the other of the two structures is adjacent or directly connected with a lower surface of the intervening structure. The intervening structure may be a single-layer or multi-layer physical structure or a non-physical structure, and the present disclosure is not limited thereto. In the present disclosure, when a certain structure is disposed "on/above" other structures, it may refer that the certain structure is "directly" disposed on/above the other structures, or the certain structure is "indirectly" disposed on/above the other structures, i.e., at least one structure is disposed between the certain structure and the other structures.

The terms "about", "equal", "identical/the same", or "substantially/approximately" mentioned in this document generally mean being within 20% of a given value or range, or being within 10%, 5%, 3%, 2%, 1% or 0.5% of the given value or range.

Furthermore, any two values or directions used for comparison may have a certain error. If a first value is equal to a second value, it implies that there may be an error of about 10° 6 between the first value and the second value; if a first direction is perpendicular or "substantially" perpendicular to a second direction, then an angle between the first direction and the second direction may be between 80 degrees to 100 degrees; if the first direction is parallel or "substantially" parallel to the second direction, an angle between the first direction and the second direction may be between 0 degree to 10 degrees.

Although ordinal numbers such as "first", "second", etc., may be used to describe elements in the description and the claims, it does not imply and represent that there have other previous ordinal number. The ordinal numbers do not represent the order of the elements or the manufacturing order of the elements. The ordinal numbers are only used for discriminate an element with a certain designation from another element with the same designation. The claims and the description may not use the same terms. Accordingly, a first element in the description may be a second element in the claims.

In addition, the term "a given range is from a first value to the second value" or "a given range falls within a range from a first value to a second value" refers that the given range includes the first value, the second value and other values therebetween.

Moreover, the electronic device of the present disclosure may include a display device, a backlight device, an antenna device, a sensing device, a tiled device, a touch display device, a curved display device or a free shape display device, but not limited thereto. The electronic device may exemplarily include liquid crystal, light emitting diode, fluorescence, phosphor, other suitable display media or a combination thereof, but not limited thereto. The display device may be a non-self-luminous type display device or a self-luminous type display device. The antenna device may be a liquid-crystal-type antenna device or a non-liquid-crystal-type antenna device. The sensing device may be a device for sensing capacitance, light, thermal or ultrasonic, but not limited thereto. The electronic components of the electronic device may include passive components and active components, such as capacitors, resistors, inductors, diodes, transistors, etc., but not limited thereto. The diode may include a light emitting diode (LED) or a photodiode. The light emitting diode may include organic light emitting diode (OLED), mini LED, micro LED or quantum dot LED, but not limited thereto. The tiled device may exemplarily be a tiled display device or a tiled antenna device, but not limited thereto. Furthermore, the electronic device may be any combination of aforementioned devices, but not limited thereto. Furthermore, the electronic devices may be foldable or flexible electronic devices. The electronic device may be any combination of aforementioned devices, but not limited thereto. Furthermore, a shape of the electronic device may be a rectangle, a circle, a polygon, a shape with curved edge or other suitable shape. The electronic device may have peripheral systems, such as a driving system, a control system, a light system, etc., for supporting the display device, the antenna device or the tiled device.

In the present disclosure, it should be understood that a depth, a thickness, a width or a height of each element, or a space or a distance between elements may be measured by an optical microscopy (ow, a scanning electron microscope (SEM), a film thickness profiler (a-step), an ellipsometer or other suitable methods. In some embodiments, a cross-sectional image including elements to be measured can be obtained by the SEM, and the depth, the thickness, the width or the height of each element, or the space or the distance between elements can be measured thereby.

It should be noted that the technical features in different embodiments described in the following can be replaced, recombined, or mixed with one another to constitute another embodiment without departing from the spirit of the present disclosure.

Unless otherwise defined, all terms (including technical and scientific terms) used herein have the same meaning as commonly understood by a person having ordinary skill in the art to which the disclosure belongs. It can be understood that these terms, such as those defined in commonly used dictionaries, should be interpreted as having meanings consistent with the background or context of the related technology and the present disclosure, and should not be interpreted in an idealized or overly formal manner, unless otherwise specified in the disclosed embodiments.

In the present disclosure, the following drawings are described in conjunction with the XYZ Cartesian coordinate system for the sake of convenience. In the present disclosure, the terms such as "-space" or "distance" between elements and "width" or "length" of the element are defined by the projection of the element on the XY plane, YZ plane or XZ plane along the X direction, the Y direction or the Z direction. Similarly, terms such as "parallel" or "non-parallel" used herein refers to the projections of the extending lines of the elements on the KY plane, the YZ plane, or the XZ plane are "'parallel" or "non-parallel." The term "angle" used herein refers to the angle between the edges of two elements.

In the present disclosure, one element "overlap" with another element refers that at least of a portion of the element overlap with at least a portion of the another element along a direction.

Figure 2A:
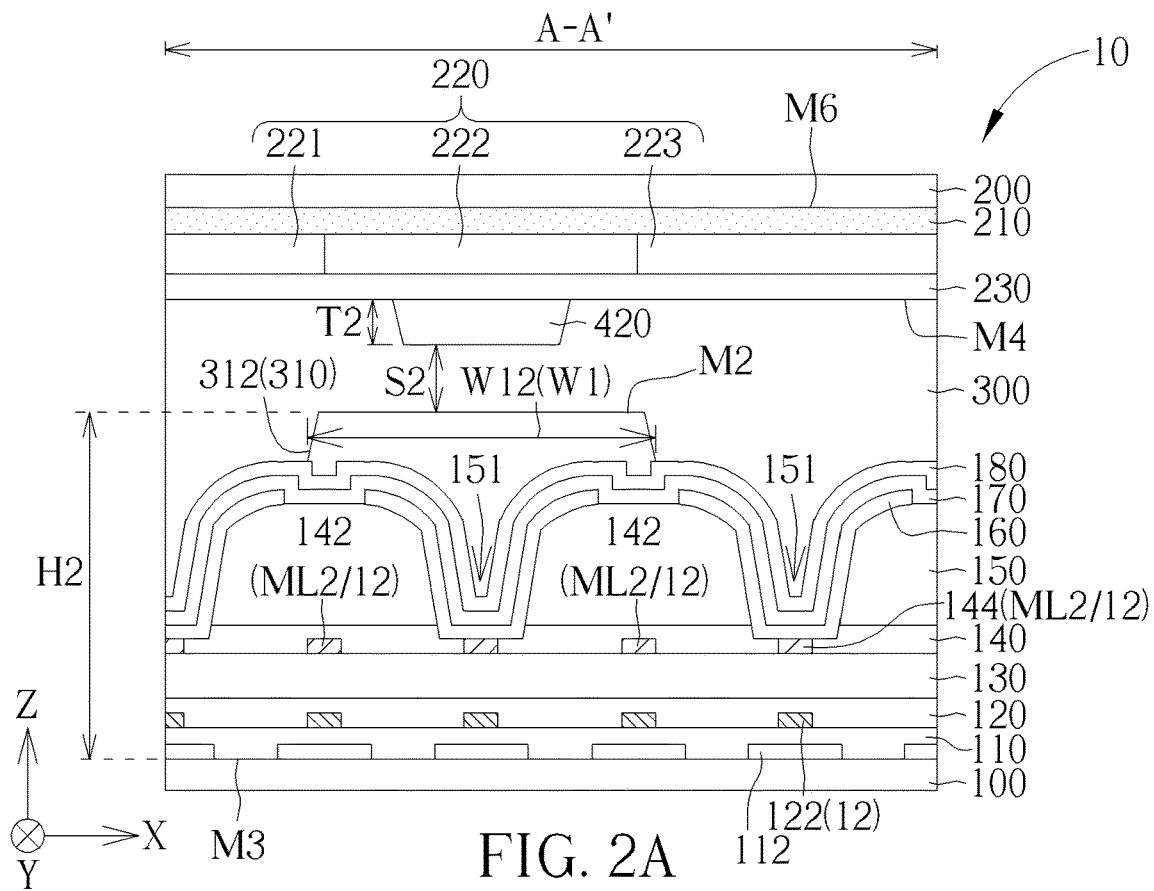
FIG. 2A is a schematic diagram showing a partial cross-sectional view taken along line A-A' of the electronic device shown in FIG. 1.
Figure 2B:
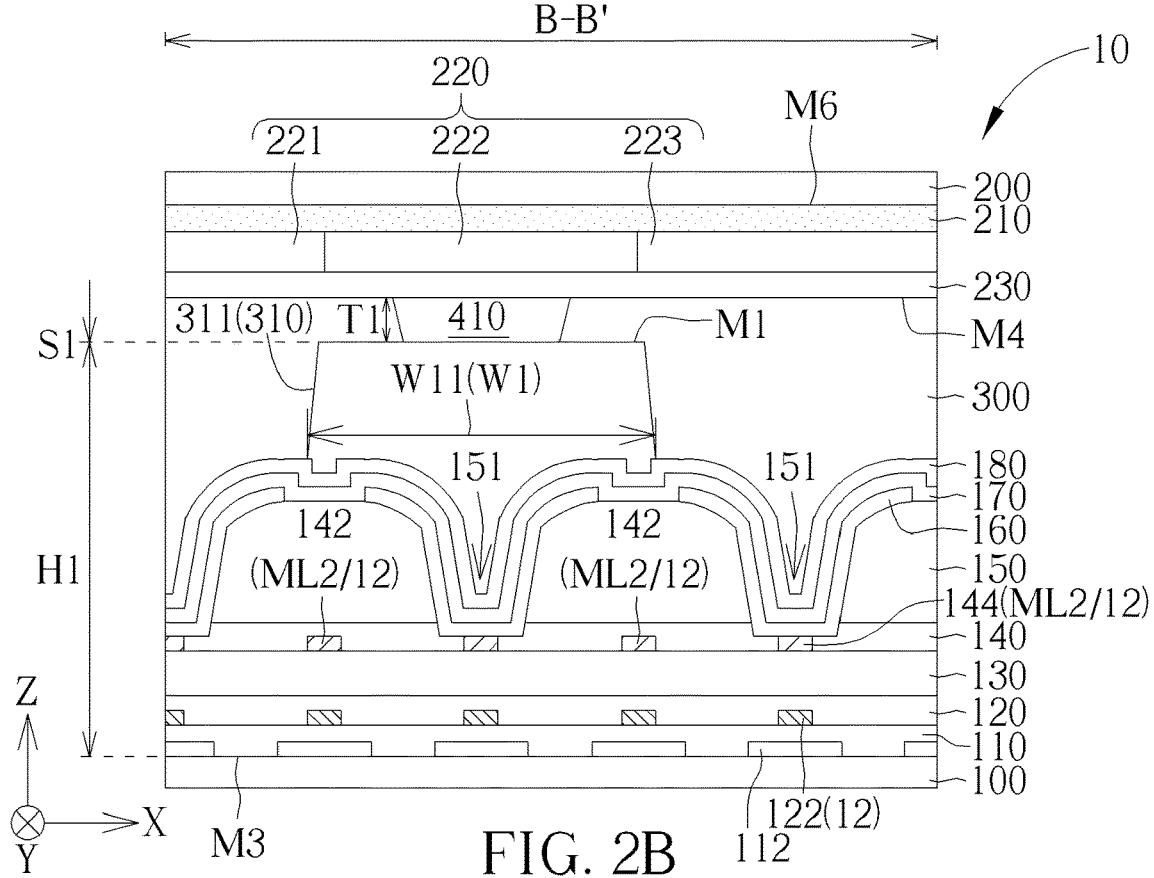
FIG. 2B is a schematic diagram showing a partial cross-sectional view taken along line B-B' of the electronic device shown in FIG. 1.

Please refer to FIG. 1, FIG. 2A and FIG. 2B. FIG. 1 is a schematic diagram showing a top view of an electronic device 10 according to an embodiment of the present disclosure. FIG. 2A is a schematic diagram showing a partial cross-sectional view taken along line A-A' of the electronic device 10 shown in FIG. 1. FIG. 2B is a schematic diagram showing a partial cross-sectional view taken along line B-B' of the electronic device 10 shown in FIG. 1. In the embodiment, the electronic device 10 is applied as a display device, but not limited thereto. The electronic device 10 may also include other functions, such as touch and detection, but not limited thereto. In some embodiments, the electronic device 10 may include a virtual reality electronic device.

The electronic device 10 has a plurality of sub-pixels 11, and the plurality of sub-pixels 11 are arranged along a first direction (such as direction X) and a second direction (such as direction Y) to form a sub-pixel matrix. Herein, the first sub-pixel 11a, the second sub-pixel 11b and the third sub-pixel 11c are labeled exemplarily. The shape of the sub-pixel 11 can be adjusted according to product requirements. Herein, the electronic device 10 is exemplary a flat electronic device. In other embodiments of the present disclosure, the electronic device 10 may be a non-flat electronic device such as a curved electronic device.

The electronic device 10 may include a substrate 100 and an opposite substrate 200, and the opposite substrate 200 is disposed corresponding to the substrate 100. In some embodiments, the electronic device 10 may further include a display medium layer 300 disposed between the substrate 100 and the opposite substrate 200. For example, the display medium layer 300 is a liquid crystal layer, but not limited thereto. In some embodiments, the electronic device 10 may further include a sealant layer (not shown) disposed between the substrate 100 and the opposite substrate 200. The sealant layer may be used to bond the substrate 100 and the opposite substrate 200, so as to encapsulate the display medium layer 300 between the substrate 100 and the opposite substrate 200.

The substrate 100 may be exemplary an array substrate or a driving substrate. The driving substrate refers to a substrate formed with a thin-film transistor (TFT) and/or an indium tin oxide (ITO) electrode. Herein, the substrate 100 is exemplarily formed with the thin-film transistor. In the embodiment, a patterned light shielding layer 112, an insulating layer 110, a patterned semiconductor layer 122, an insulating layer 120 (such as a gate dielectric layer), a patterned first metal layer ML1 (shown in FIG. 1), an insulating layer 130, a patterned second metal layer ML2, an insulating layer 140 and an insulating layer 150 may be sequentially formed on an upper surface M3 of the substrate 100 from bottom to top. The insulating layer 110 covers the light shielding layer 112. The insulating layer 120 is located between the semiconductor layer 122 and the first metal layer ML1. The insulating layer 140 covers the second metal layer ML2. A plurality of the gate lines 124 extending along the direction X may be formed in the first metal layer ML1. A plurality of data lines 142 and a plurality of drains 144 may be formed in the second metal layer ML2. The data lines 142 may extend along the direction Y and intersect with the gate lines 124. In some embodiments, the extending direction of the gate lines 124 may not be perpendicular to the extending direction of the data lines 142. The semiconductor layer 122, a portion of the gate line 124 corresponding to the semiconductor layer 122, a portion of the data line 142 (as the source) and the drain 144 form a thin film transistor as the driving element 12. The pixel electrodes 160 and the common electrode 180 are disposed on the insulating layer 150. The insulating layer 170 is disposed between the pixel electrodes 160 and the common electrode 180 to electrically separate the pixel electrodes 160 and the common electrode 180. The insulating layer 150 has a plurality of vias 151. Each of the via 151 is configured to expose at least a portion of the drain 144. The pixel electrode 160 is electrically connected to the drain 144 through the via 151. The insulating layer 120 and the insulating layer 130 are formed with holes HH (see FIG. 1, the position of the holes HH are shown by dotted lines in FIG. 1). The extending direction of the hole HH is substantially parallel to the extending direction of the gate line 124, both of which are parallel to the first direction. The portion of the data line 142 as the source can be electrically connected with the corresponding semiconductor layer 122 through the hole HH, and the drain 144 can also be electrically connected with the corresponding semiconductor layer 122 through the hole HH. In other words, the driving element 12 is disposed on the substrate 100, the insulating layer 150 is disposed an the driving element 12, the insulating layer 150 has the vias 151, the pixel electrodes 160 are disposed on the insulating layer 150, and the pixel electrodes 160 are electrically connected with the driving element 12 through the vias 151.

A light shielding layer 210, a color filter layer 220 and an insulating layer 230 may be sequentially formed on the inner surface M6 of the opposite substrate 200 from top to bottom. The light shielding layer 210, such as a black matrix layer, may include a plurality of openings 211. The color filter layer 220 may include a green photoresist layer 221, a blue photoresist layer 222 and/or a red photoresist layer 223. At least a portion of the color filter layer 220 overlaps with the openings 211 of the light shielding layer 210, so as to adjust the color of light passing through each of the openings 211. In the embodiment, the first sub-pixel 11a, the second sub-pixel 11b and the third sub-pixel 11c may be respectively corresponding to the green photoresist layer 221, the blue photoresist layer 222 and the red photoresist layer 223 of the color filter layer 220, but not limited thereto. The materials of the insulating layer 230 may include but are not limited to transparent organic materials such as photoresist materials. In some embodiments at least parts of the layers and/or elements on the opposite substrate 200 may be disposed on the substrate 100, but not limited thereto. In addition, one side of the electronic device 10 may also be disposed with a backlight element (not shown). For example, the backlight element can be disposed below the substrate 100. The backlight element may include light emitting diodes (LEDs), submillimeter light emitting diodes (mini LEDs), micro light emitting diodes (micro LEDs), quantum dots (MMs), quantum dot light emitting diodes (QLEDs, QD-LEDs), fluorescence, phosphor, other suitable materials, or a combination thereof, but not limited thereto.

The substrate 100 and the opposite substrate 200 may exemplary be flexible or inflexible substrates. The substrate 100 and the opposite substrate 200 may be transparent substrates, and the materials thereof may exemplarily include glass, quartz, sapphire, polyimide (PI), polycarbonate (PC), polyethylene terephthalate (PET), other suitable materials or a combination thereof, but not limited thereto. The insulating layer 110, the insulating layer 120, the insulating layer 130, the insulating layer 140 and the insulating layer 170 may include inorganic materials (such as silicon oxide, silicon nitride, silicon oxynitride, or stacking layers including at least two of the aforementioned materials). The insulating layer 150 may exemplarily include organic materials (such as polyimide resin, epoxy resin or acrylic resin), but not limited thereto. Materials of the semiconductor layer 122 may exemplarily include amorphous silicon, low temperature polysilicon (LIPS), metal oxides (such as indium gallium zinc oxide (IGZO)) other suitable materials or a combination thereof.

In FIG. 1, some components disposed on the substrate 100 and the opposite substrate 200 are omitted for the sake of simplification, such as the insulating layer 110, the insulating layer 120, the insulating layer 130, the insulating layer 140, the insulating layer 150, the light shielding layer 112, the pixel electrodes 160, the common electrode 180, the insulating layer 170 on the substrate 100, and the color filter layer 220 and the insulating layer 230 on the opposite substrate 200. In addition, the display medium layer 300 is also omitted in FIG. 1.

The aforementioned "sub-pixel" may refer to all film layers (at least including the pixel electrode 160, a portion of the common electrode 160 and the corresponding driving element 12) along the normal direction (i.e., the direction Z) in the area surrounded by two adjacent data lines 142 and two adjacent gate lines 124.

The electronic device 10 may further include the spacer 310. As shown in FIG. 1, the gate lines 124 are disposed on the substrate 100 and extend along the first direction (such as the direction X). The spacer 310 is disposed on the gate line 124 and overlaps with the gate line 124. The spacer 310 has a first width W1 along the first direction, one of the plurality of sub-pixels 11 has a sub-pixel pitch P along the first direction, and the first width W1 and the sub-pixel pitch P satisfy the following relationship: P≤W1 (Formula (1)). Thereby, it is beneficial to reduce the light shielding range required by the spacer 310. In some embodiments, the first width W1 and the sub-pixel pitch P may satisfy the following relationship: P≤W1<3×P (Formula (2)). The aforementioned "the spacer 310 overlaps with the gate line 124" may refer that at least a portion of the spacer 310 overlaps with at least a portion of the gate line 124 in the top view (for example, the view angle parallel to the direction Z). The aforementioned "sub-pixel pitch P", taking the direction X as an example, may refer to the distance between the same edges (left edge or right edge) of two adjacent data lines 142 or the distance between two center lines (not shown) of two adjacent data lines 142. In FIG. 1, the sub-pixel pitch P are exemplary the distance between two right edges of two adjacent data lines 142 and the distance between two left edges of two adjacent data lines 142.

Specifically, the spacer 310 exemplarily includes a main spacer 311 and a sub-spacer 312. The main spacer 311 is disposed on the gate line 124 (the gate line 124 at the lower position of FIG. 1), and at least a portion of the main spacer 311 overlaps with at least a portion of the gate line 124 (the gate line 124 at the lower position of FIG. 1). The main spacer 311 has a width W11 along the first direction, which satisfies the following relationship: P≤W11<3×P. The sub-spacer 312 is disposed on the gate line 124 (the gate line 124 at the upper position of FIG. 1), and at least a portion of the sub-spacer 312 overlaps with at least a portion of the gate line 124 (the gate line 124 at the upper position of FIG. 1). The sub-spacer 312 has a width W12 along the first direction, which satisfies the following relationship: P≤W12<3×P. The aforementioned "first width W1" of the spacer 310 may be the width W11 of the main spacer 311 or the width W12 of the sub-spacer 312, In other words, at least one of the width W11 of the main spacer 311 and the width W12 of the sub-spacer 312 satisfying Formula (1) or Formula (2) is within the scope of the present disclosure. In FIG. 2A, and FIG. 2B, widths of the main spacer 311 and the sub-spacer 312 may change gradually along the direction Z. A top surface M1 of the main spacer 311 and a top surface M2 of the sub-spacer 312 may be flat surfaces. However, the present disclosure is not limited thereto. In some embodiments, the top surface M1 of the main spacer 311 and the top surface M2 of the sub-spacer 312 may be non-flat surfaces, such as curved surfaces which protrude upwardly. The width W11 of the main spacer 311 may be the maximum width of the main spacer 311 along the first direction, and the width W12 of the sub-spacer 312 may be the maximum width of the sub-spacer 312 along the first direction. In other words, the width W11 of the main spacer 311 may be the maximum width of the projection of the main spacer 311 on the XY plane along the first direction, and the width W12 of the sub-spacer 312 may be the maximum width of the sub-spacer 312 on the XY plane along the first direction. In the embodiment of the present disclosure, two opposite ends of "the main spacer 311" (such as the two opposite ends along the direction Z) may respectively contact the film layer on the substrate 100 and the film layer on the opposite substrate 200. In the embodiment of the present disclosure, one of the two opposite ends of "the sub-spacer 312" (such as the two opposite ends along the direction Z) may be disposed on one of the substrate 100 and the opposite substrate 200, and the other end of the sub-spacer 312 does not contact with the other one of the substrate 100 and the opposite substrate 200 when the electronic device 10 is not pressed. In some embodiments, the materials of the spacer 310 may include photoresist materials, but the present disclosure is not limited thereto.

As shown in FIG. 2A and FIG. 2B, the main spacer 311 and the sub-spacer 312 are disposed on the substrate 100 and are located between the substrate 100 and the opposite substrate 200. The main spacer 311 has a first height H1, the sub-spacer 312 has a second height H2, and the first height H1 is greater than the second height H2. The electronic device 10 may further include a first pattern 410 and a second pattern 420. The first pattern 410 is disposed between the opposite substrate 200 and the main spacer 311. The second pattern 420 is disposed between the opposite substrate 200 and the sub-spacer 312. The first pattern 410 has a first thickness T1, the second pattern 420 has a second thickness T2, and the first thickness T1 may be equal to the second thickness T2. The first height H1 may be the maximum distance between the top surface M1 of the main spacer 311 and the upper surface M3 of the substrate 100 along the normal direction. The second height H2 may be the maximum distance between the top surface M2 of the sub-spacer 312 and the upper surface M3 of the substrate 100 along the normal direction. The aforementioned first thickness T1 may be the protruding length or protruding height of the first pattern 410 along the normal direction. For example, the first thickness T1 may be the maximum protruding height of the first pattern 410 relative to the inner surface M4 of the insulating layer 230 along the normal direction. The aforementioned second thickness T2 may be the protruding length or protruding height of the second pattern 420 along the normal direction. For example, the second thickness T2 may be the maximum protruding height of the second pattern 420 relative to the inner surface M4 of the insulating layer 230 along the normal direction.

The first pattern 410 abuts against the main spacer 311 to form a cell gap between the substrate 100 and the opposite substrate 200. The cell gap can be used to accommodate other components of the electronic device 10 such as the display medium layer 300. With the first pattern 410 and the second pattern 420, the first height H1 and the second height H2 can be reduced while maintaining the same cell gap. When the electronic device 10 is applied as a liquid crystal display device, alignment films (not shown) will be coated on the inner sides of the substrate 100 and the opposite substrate 200 after desired film layers are formed on the substrate 100 and the opposite substrate 200. The materials of the alignment film may include but are not limited to polyimide (PI). By reducing the first height H1 and the second height H2, the probability of scratching the alignment films due to the shift of the spacer 310 when assembling the substrate 100 and the opposite substrate 200 may be reduced, and the alignment film halo and the range of poor alignment (such as poor alignment of liquid crystals) can be reduced. Furthermore, with the first thickness T1 being equal to the second thickness T2, it is beneficial to simplify the manufacturing process of the first pattern 410 and the second pattern 420.

The first pattern 410 and the second pattern 420 may be made of transparent or opaque materials. For example, the materials of the first pattern 410 and the second pattern 420 may be independently identical to the materials or the paints of the light shielding layer 210, the insulating layer 230 or the spacer 310. In some embodiments, the materials of the first pattern 410 and the second pattern 420 may be the same or similar to that of the spacer 310. In some embodiments, the materials of the first pattern 410 and the second pattern 420 may include conductive materials (such as metal or ITO) or insulating materials, but the present disclosure is not limited thereto.

A first distance S1 is between the main spacer 311 and the first pattern 410, a second distance S2 is between the sub-spacer 312 and the second pattern 420, and the first distance 31 is smaller than the second distance 32. In the embodiment, the main spacer 311 abuts against the first pattern 410, and the first distance S1 is 0. The sub-spacer 312 does not abut against the second pattern 420, and the second distance S2 is greater than, 0.

In some embodiments, the first height H1 of the main spacer 311 may be equal to the second height H2 of the sub-spacer 312. In this case, the electronic device 10 may only include the first pattern 410 but does not include the second pattern 420. The first pattern 410 may be disposed between the opposite substrate 200 and the main spacer 311, and the first pattern 410 abuts against the main spacer 311. Thereby, it is beneficial to simplify the manufacturing process of the main spacer 311 and the sub-spacer 312. For example, compared with the main spacer 311 and the sub-spacer 312 with different heights, one mask process can be omitted, or a complicated half-grayscale mask to fabricate the main spacer 311 and the sub-spacer 312 with different heights is not required, and the cost can be reduced.

As shown in FIG. 2A and FIG. 2B, the color filter layer 220 is disposed between the first pattern 410 and the opposite substrate 200. In the embodiment, both the first pattern 410 and the second pattern 420 are disposed corresponding to the blue photoresist layer 222, but not limited thereto. The first pattern 410 and the second pattern 420 may be independently disposed corresponding to the green photoresist layer 221, the blue photoresist layer 222 or the red photoresist layer 223. When the first pattern 410 and the second pattern 420 are disposed corresponding to the blue photoresist layer 222 or the red photoresist layer 223, it is beneficial to reduce the influence of the light leakage caused by the main spacer 311 and the sub-spacer 312 on the display image. In other embodiments, the color filter layer 220 may also be disposed between the substrate 100 and the spacer 310, but the present disclosure is not limited thereto.

As shown in FIG. 1, the main spacer 311 has a long axis direction (such as the direction X) parallel to the first direction, and the main spacer 311 overlaps with the gate line 124 (the gate line 124 at the lower position of FIG. 1). Specifically, the main spacer 311 has a rectangular shape in the top view, wherein the long axis direction is corresponding to the long side direction of the rectangular shape and is parallel to the extending direction of the gate line 124. As shown in FIG. 2E, at least a portion of the main spacer 311 is disposed in the via 151. As shown in FIG. 2A, at least a portion of the sub-spacer 312 is disposed in the via 151. In the embodiment of the present disclosure, the four corners of the "rectangle" may be non-right angles, such as rounded angles or arc-shaped angles.

Figure 3A:
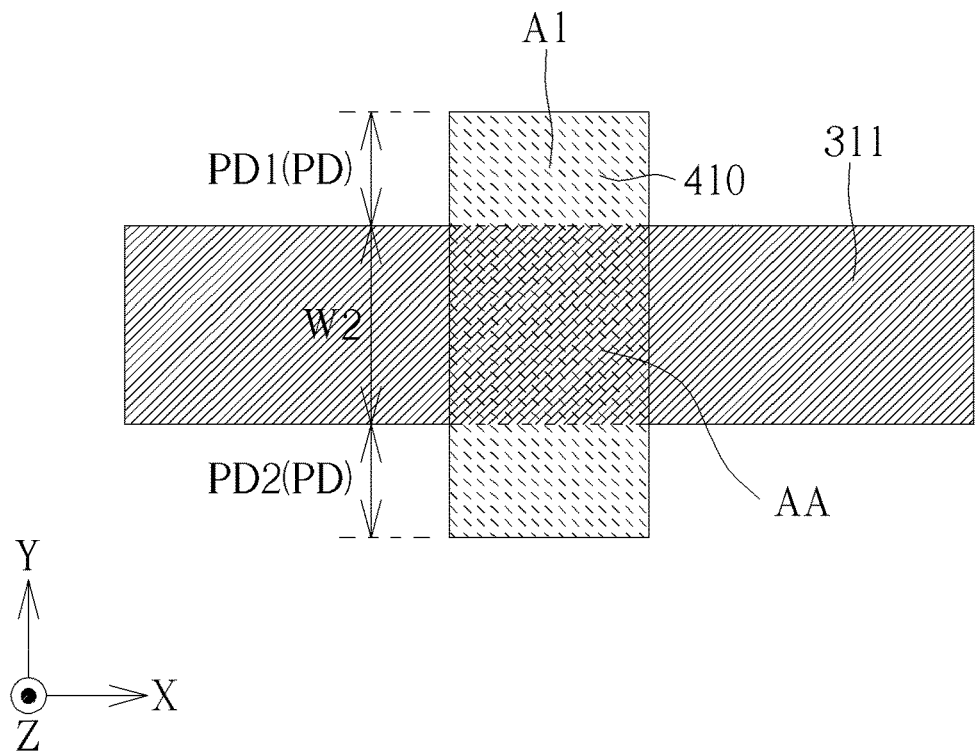
FIG. 3A is a schematic diagram showing an enlarged top view of a main spacer and a first pattern according to an embodiment of the present disclosure.

Please refer to FIG. 3A, which is a schematic diagram showing an enlarged top view of a main spacer 311 and a first pattern 410 according to an embodiment of the present disclosure. The main spacer 311 has a second width W2 along the second direction perpendicular to the first direction (i.e., the length along the short axis direction of the main spacer 311). The first pattern 410 has a protruding distance PD relative to the main spacer 311 along the second direction, and the second width W2 and the protruding distance PD may satisfy the following relationship: PD>0.05×W2 (Formula (3)). Thereby, it is beneficial to improve the abutting stability between the main spacer 311 and the first pattern 410, so as to maintain the stability of the cell gap between the substrate 100 and the opposite substrate 200. Furthermore, the long axis is defined as a straight line extending lengthwise through a center of an object. For an elongated or elliptical object, the long axis is closest to its maximal longitudinal dimension. For objects that do not have a clear long axis, the long axis may refer to a long side of a smallest rectangle that can enclose the object.

Specifically, the first pattern 410 has a first protruding distance PD1 relative to the main spacer 311 along the second direction, which satisfies the following relationship: PD1>0.05×W2. The first pattern 410 has a second protruding distance PD2 relative to the main spacer 311 along the second direction, which satisfies the following relationship: PD>0.05×W2. The first protruding distance PD1 may be equal to or unequal to the second protruding distance PD2. "The protruding distance PD" may be the first protruding distance PD1 or the second protruding distance PD2. In other words, at least one of the first protruding distance PD1 and the second protruding distance PD2 satisfying Formula (3) is within the scope of the present disclosure. In the embodiment, both sides of the first pattern 410 protrude relative to the main spacer 311 along the second direction, but the present disclosure is not limited thereto. In some embodiments, the first pattern 410 may unilaterally protrude relative to the main spacer 311.

The first pattern 410 has a first area A1, the first pattern 410 and the main spacer 311 have an overlapping area AA, and the first area A1 and the overlapping area AA satisfy the following relationship: AA>0.05×A1. Moreover, the first area A1 and the overlapping area AA may satisfy the following relationship: AA>0.3×A1. Thereby, it is beneficial to improve the abutting stability between the main spacer 311 and the first pattern 410, so as to maintain the stability of the cell gap between the substrate 100 and the opposite substrate 200. In the embodiment, both the first pattern 410 and the main spacer 311 are arranged as rectangles, so that the overlapping area AA is smaller. That is, the abutting area is smaller, and the influence on the opening rate of the pixel caused by the offset can be reduced. However, the present disclosure is not limited thereto. In some embodiments, the first pattern 410 and the main spacer 311 may be independently arranged as other shapes according to actual needs, such as square, rhombus, ellipse, etc.

Figure 3B:
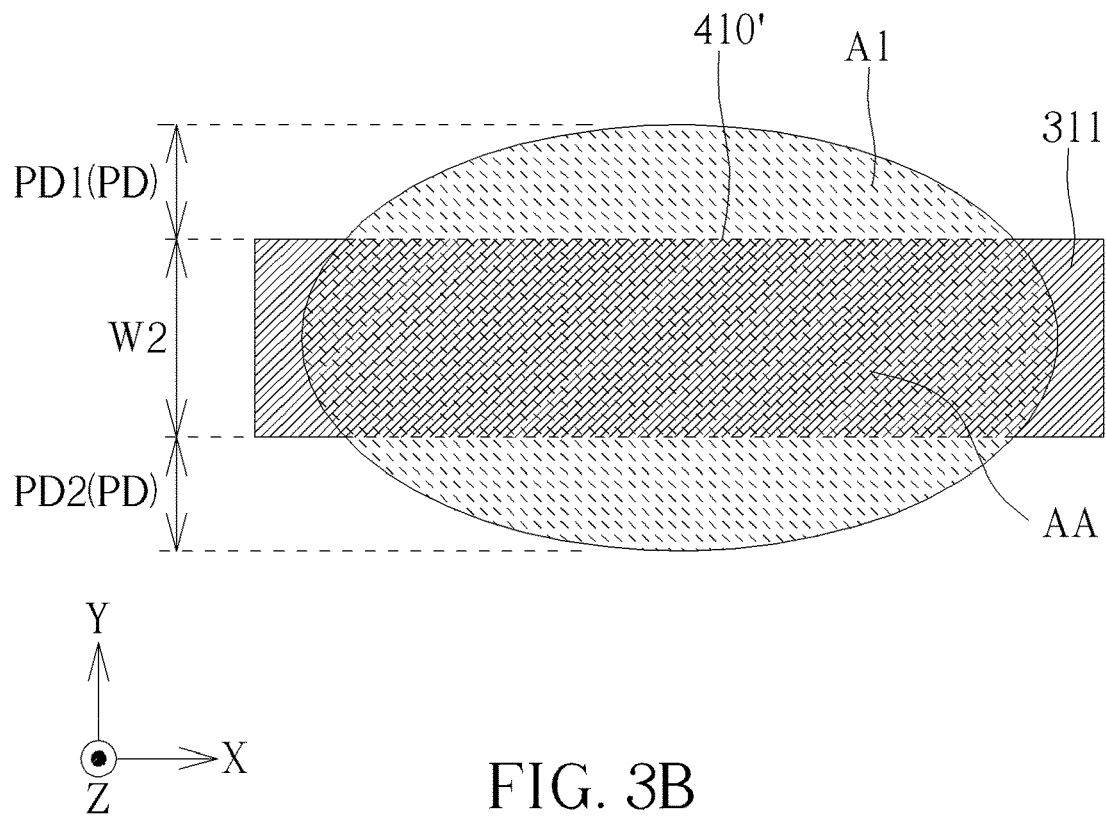
FIG. 3B is a schematic diagram showing an enlarged top view of a main spacer and a first pattern according to another embodiment of the present disclosure.

Please refer to FIG. 3E, which is a schematic diagram showing an enlarged top view of a main spacer 311 and a first pattern 410' according to another embodiment of the present disclosure. The difference between FIG. 3A and FIG. 3B is that the first pattern 410' is arranged as an ellipse, so that the overlapping area AA is larger. That is, the abutting area is larger, which can improve the stability of the cell gap between the substrate 100 and the opposite substrate 200. For other details of the main spacer 311 and the first pattern 410', references may be made to that of FIG. 3A and are not be repeated herein.

Figure 4:
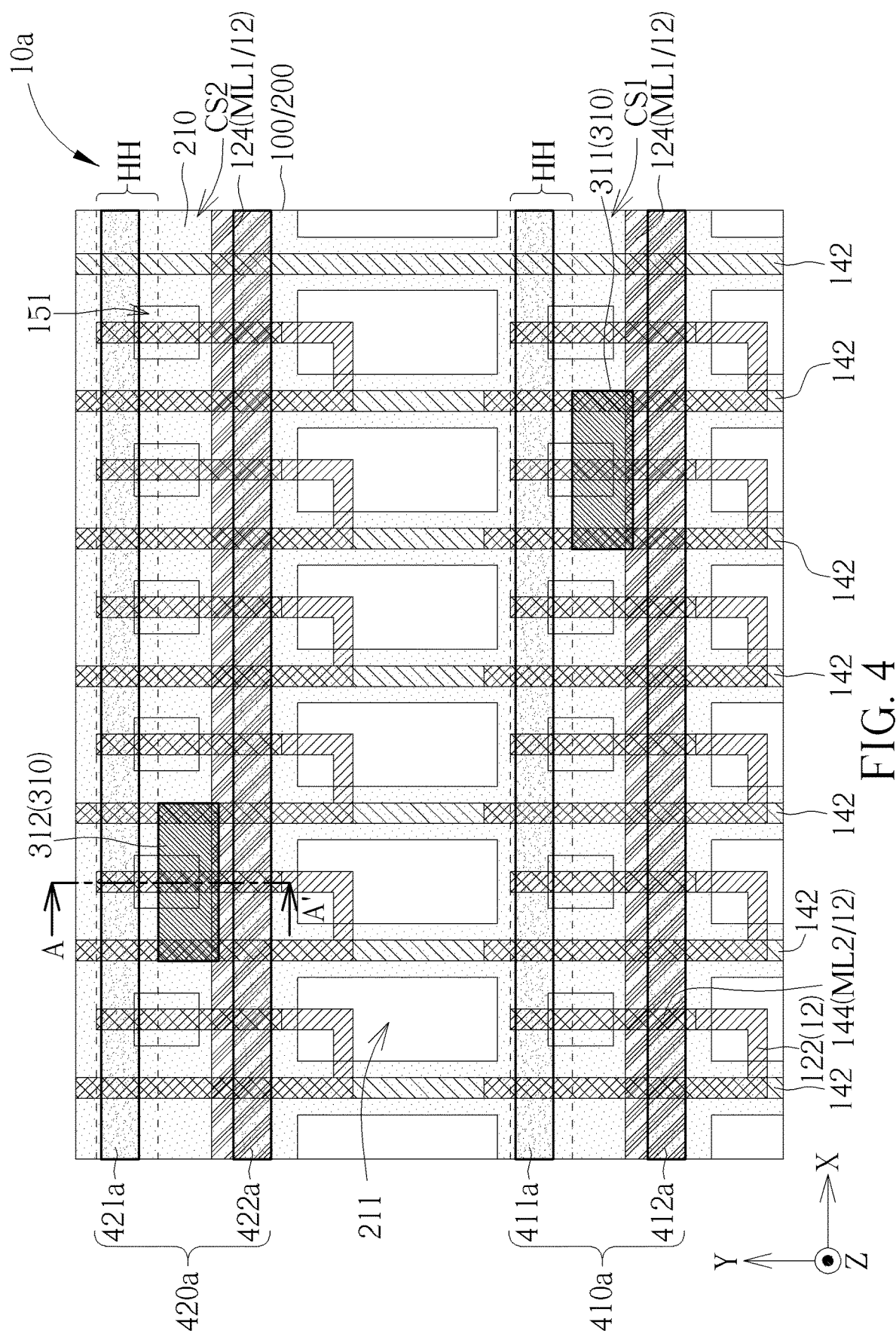
FIG. 4 is a schematic diagram showing a top view of an electronic device according to another embodiment of the present disclosure.
Figure 6:
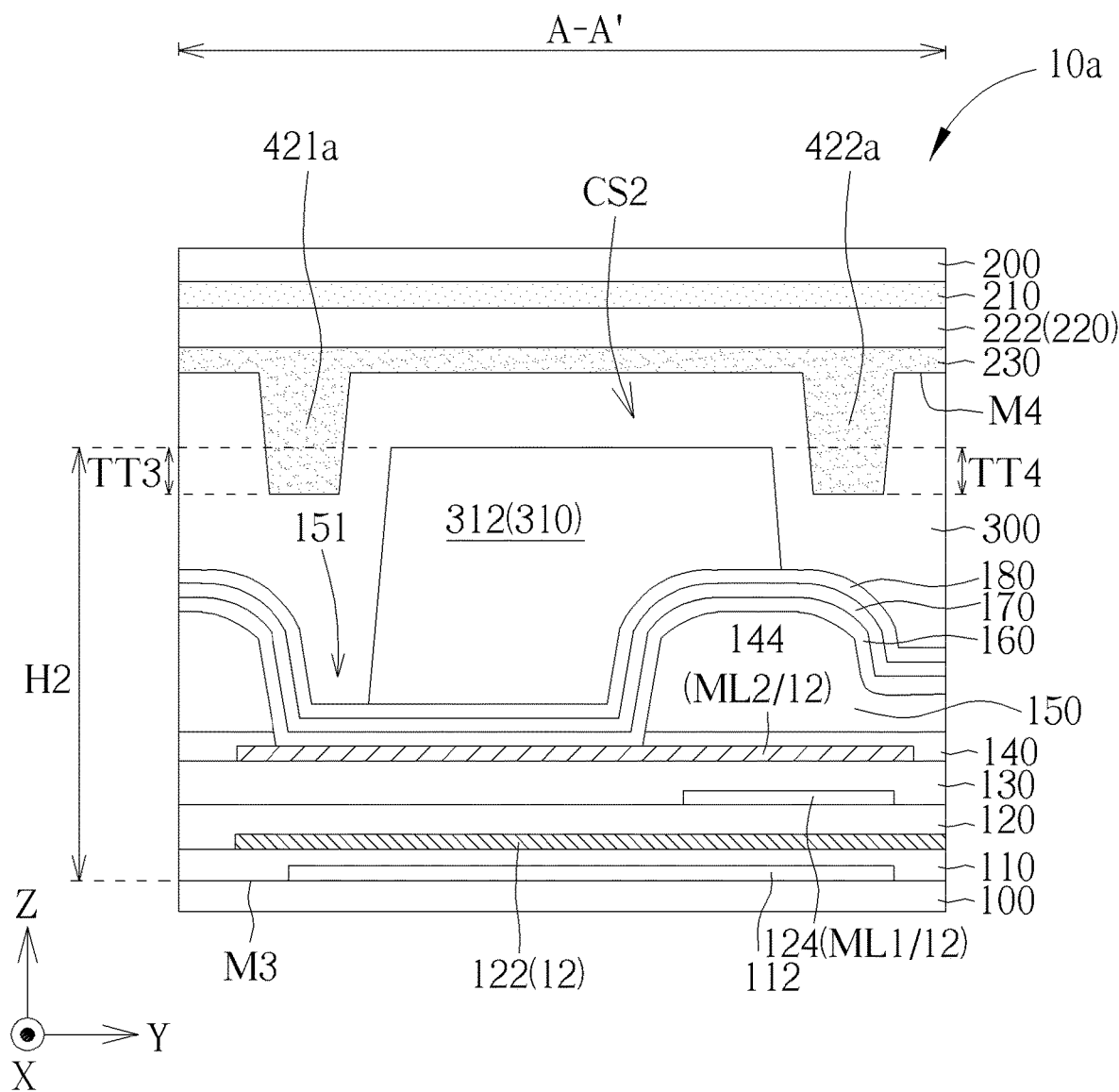
FIG. 6 is a schematic diagram showing a partial cross-sectional view taken along line A-A' of the electronic device shown in FIG. 4.

Please refer to FIG. 4 and FIG. 6, FIG. 4 is a schematic diagram showing a top view of an electronic device 10a according to another embodiment of the present disclosure, and FIG. 6 is a schematic diagram showing a partial cross-sectional view taken along line A-A' of the electronic device 10a shown in FIG. 4. Similar to FIG. 1, some components disposed on the substrate 100 and the opposite substrate 200 are omitted in FIG. 4. The difference between FIG. 4 and FIG. 1 is that FIG. 4 shows a first pattern 410a and a second pattern 420a extending along the first direction. The main difference between the electronic device 10a and the electronic device 10 is the arrangement of the first pattern 410a and the second pattern 420a. The first pattern 410a includes a first blocking portion 411a and a second blocking portion 412a, and the second pattern 420a includes a third blocking portion 421a and a fourth blocking portion 422a. The first blocking portion 411a, the second blocking portion 412a, the third blocking portion 421a and the fourth blocking portion 422a may be integrally formed on the inner surface M4 of the insulating layer 230 and extend outwardly and parallel to the normal direction (such as the direction Z), but not limited thereto. In other embodiments, the first pattern 410a and the second pattern 420a may also include other material layers formed on the inner surface M4 of the insulating layer 230. A first inserting space CS1 is formed between the first blocking portion 411a and the second blocking portion 412a, and a second inserting space CS2 is formed between the third blocking portion 421a and the fourth blocking portion 422a. Each of the first inserting space CS1 and the second inserting space CS2 has a rectangular shape or a strip shape in the top view. In addition, each of the first blocking portion 411a, the second blocking portion 412a, the third blocking portion 421a1 and the fourth blocking portion 422a has a rectangular shape or a strip shape in the top view. The rectangle shape or the strip shape has a long axis direction parallel to the first direction (such as the direction X). In addition, the first pattern 410a and the second pattern 420a do not overlap with the main spacer 311 and the sub-spacer 312, and the first pattern 410a and the second pattern 420a partially overlap with the via 151. As shown in FIG. 6, the sub-spacer 312 is disposed corresponding to the via 151. That is, at least a portion of the sub-spacer 312 is located in the via 151. The third blocking portion 421a and the sub-spacer 312 have a third overlapping thickness TT3 along the normal direction (such as the direction Z), the fourth blocking portion 422a and the sub-spacer 312 have a fourth overlapping thickness TT4 along the normal direction (such as the direction Z) f and the third overlapping thickness TT3 is equal to the fourth overlapping thickness TT4. Similarly, the first blocking portion 411a and the main spacer 311 have a first overlapping thickness (not shown) along the normal direction (such as the direction Z) x the second blocking portion 412a and the main spacer 311 have a second overlapping thickness (not shown) along the normal direction (such as the direction Z), and the first overlapping thickness is equal to the second overlapping thickness. Thereby, the main spacer 311 is inserted in the first inserting space CS1 between the first blocking portion 411a and the second blocking portion 412a, and the sub-spacer 312 is inserted in the second inserting space 032 between the third blocking portion 421a and the fourth blocking portion 422a, which is beneficial to limit the displacement degree of the main spacer 311 and the sub-spacer 312 along the second direction. In the embodiment, the second height H2 of the sub-spacer 312 is smaller than the first height H1 of the main spacer 311 (refer to FIG. 2B). The sub-spacer 312 does not abut against the inner surface M4 of the insulating layer 230, and the main spacer 311 abuts against the inner surface M4 of the insulating layer 230(not shown). The materials of the first pattern 410a and the second pattern 420a may include transparent materials or opaque materials. In the present disclosure, the transparent materials may exemplarily include oxides, nitrides, indium tin oxides, organic materials, inorganic materials or a combination thereof, and the opaque materials may exemplarily include, photoresist materials, resins, metals, etc., but the present disclosure is not limited thereto.

Figure 5:
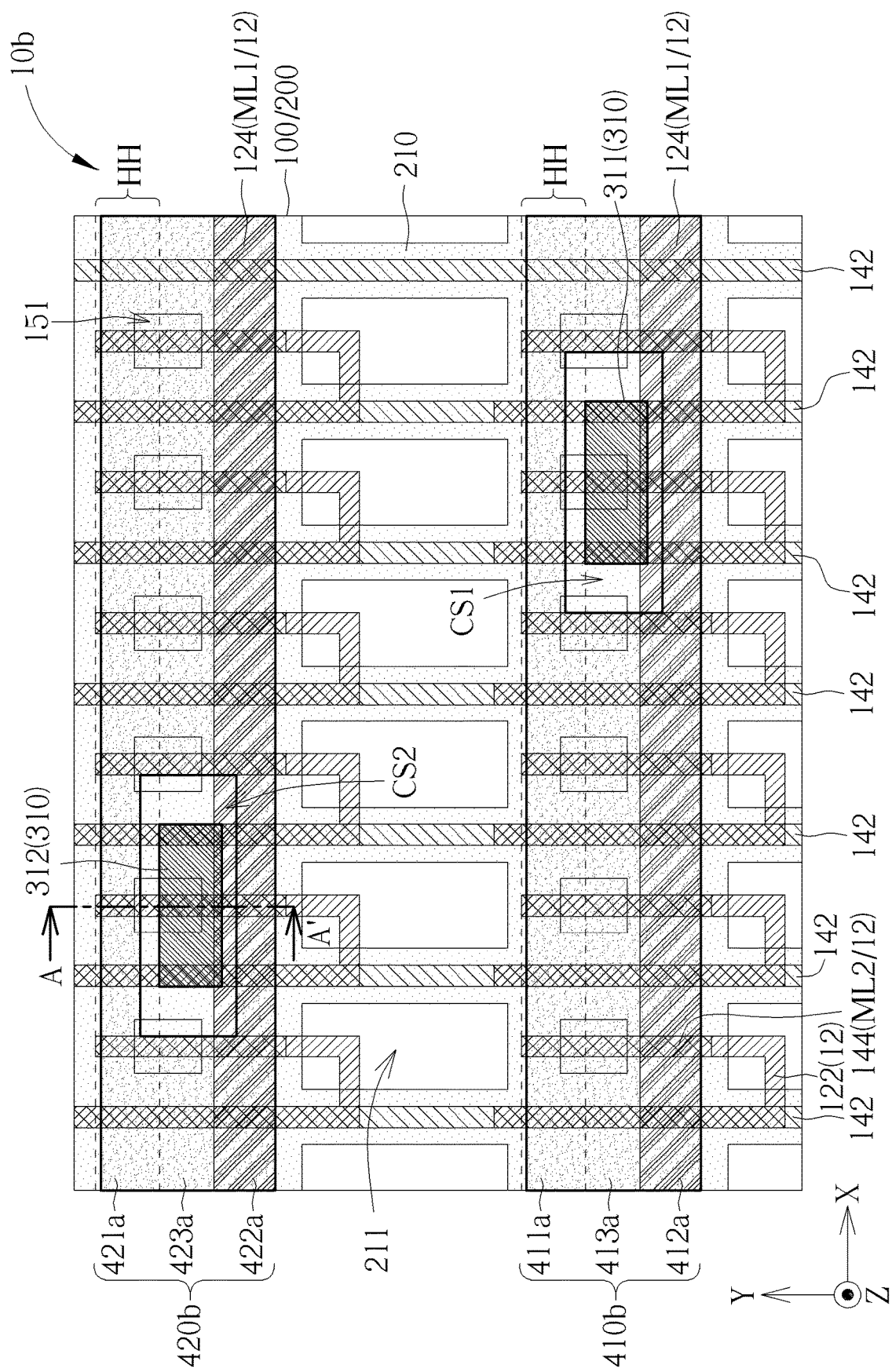
FIG. 5 is a schematic diagram showing a top view of an electronic device according to yet another embodiment of the present disclosure.

Please refer to FIG. 3, which is a schematic diagram showing a top view of an electronic device 10b according to yet another embodiment of the present disclosure. Since the partial cross-sectional view taken along line A-A' of the electronic device 10b shown in FIG. 5 is identical to that of the electronic device 10a shown in FIG. 4, please refer to FIG. 6 simultaneously. The main difference between the electronic device 10b and the electronic device 10a is the arrangement of the first pattern 410b and the second pattern 420b. The first pattern 410b includes a first blocking portion 411a, a second blocking portion 412a and a first connecting portion 413a. The first connecting portion 413a is connected between the first blocking portion 411a and the second blocking portion 412a. The second pattern 420a includes a third blocking portion 421a, a fourth blocking portion 422a and a second connecting portion 423a. The second connecting portion 423a is connected between the third blocking portion 421a and the fourth blocking portion 422a. The first blocking portion 411a, the second blocking portion 412a and the first connecting portion 413a may be integrally formed on the inner surface M4 of the insulating layer 230 and extend outwardly and parallel to the normal direction, so as to form a first inserting space CS1 between the first blocking portion 411a, the second blocking portion 412a and the first connecting portion 413a. The third blocking portion 421a1 the fourth blocking portion 422a and the second connecting portion 423a may be integrally formed on the inner surface M4 of the insulating layer 230 and extend outwardly and parallel to the normal direction, so as to form a second inserting space CS2 between the third blocking portion 421a, the fourth blocking portion 422a and the second connecting portion 423a. Each of the first inserting space CS1 and the second inserting space CS2 has a rectangular shape, an elliptical shape or other suitable shape in the top view, but the present disclosure is not limited thereto. The main spacer 311 is inserted in the first inserting space CS1, and the sub-spacer 312 is inserted in the second inserting space CS2. Thereby, it is beneficial to limit the displacement degree of the main spacer 311 and the sub-spacer 312 along the first direction and the second direction. In the embodiment, the second height H2 of the sub-spacer 312 is smaller than the first height H1 of the main spacer 311 (refer to FIG. 2B). The sub-spacer 312 does not abut against the inner surface M4 of the insulating layer 230, and the main spacer 311 abuts against the inner surface M4 of the insulating layer 230 (not shown. The materials of the first pattern 410b and the second pattern 420b may include transparent materials or opaque materials. For other details of the electronic device 10b, references may be made to that of the electronic device 10a.

Figure 7:
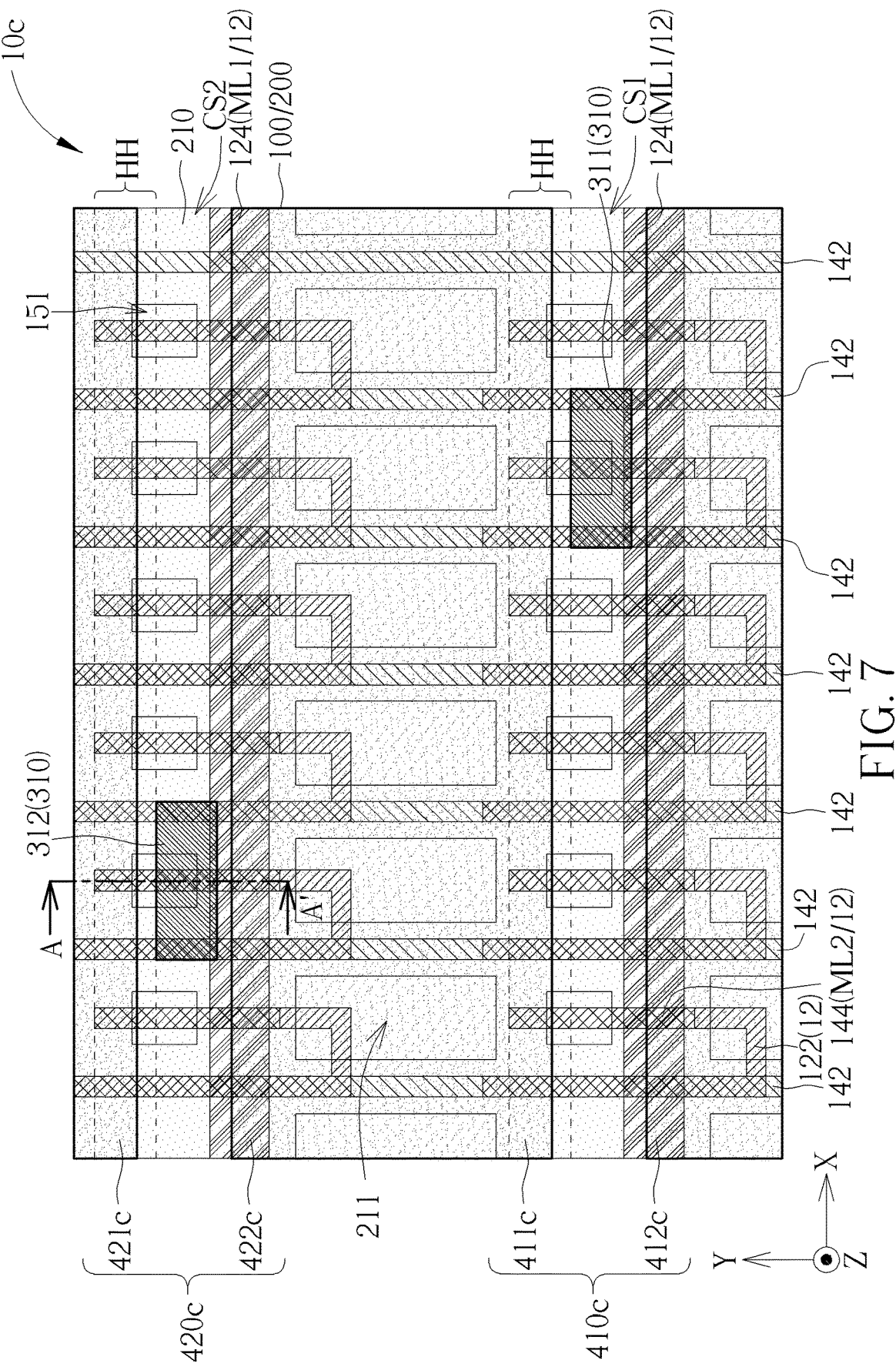
FIG. 7 is a schematic diagram showing a top view of an electronic device according to yet another embodiment of the present disclosure.
Figure 9:
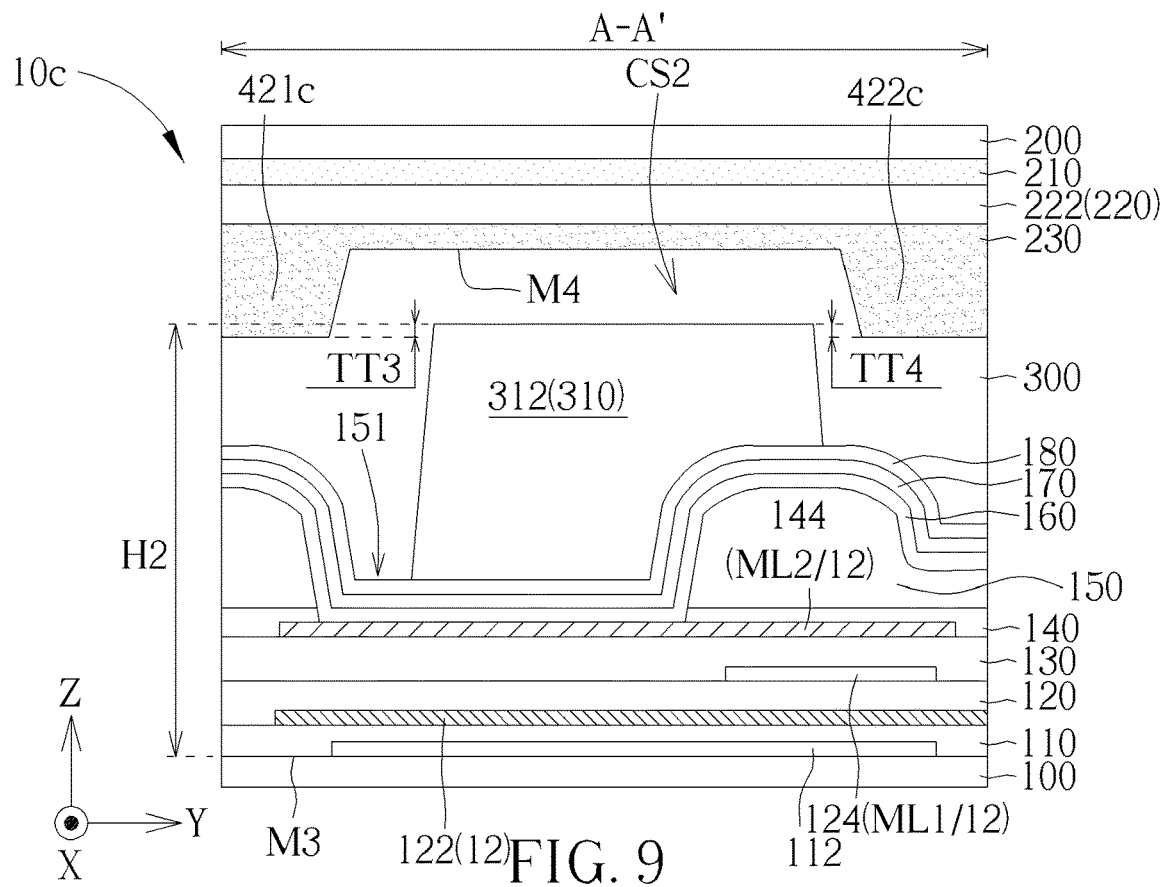
FIG. 9 is a schematic diagram showing a partial cross-sectional view taken along line A-A' of the electronic device shown in FIG. 7.

Please refer to FIG. 7 and FIG. 9, FIG. 7 is a schematic diagram showing a top view of an electronic device 10c according to yet another embodiment of the present disclosure, and FIG. 9 is a schematic diagram showing a partial cross-sectional view taken along line A-A' of the electronic device 10c shown in FIG. 7. The difference between the electronic device 10c and the electronic device 10a is the arrangement of the first pattern 410c and the second pattern 420c. In FIG. 7, a first blocking portion 411c, a second blocking portion 412c, a third blocking portion 421c, and a fourth blocking portion 422c have longer lengths in the second direction, and the first blocking portion 411c is integrally connected with the fourth blocking portion 422c, so as to form a first inserting space CS1 between the first blocking portion 411c and the second blocking portion 412c and formed a second inserting space CS2 between the third blocking portion 421c and the fourth blocking portion 422c. Each of the first inserting space CS1 and the second inserting space CS2 has a rectangular shape or a strip shape in the tap view. In addition, each of the first blocking portion 411c, the second blocking portion 412c, the third blocking portion 421c and the fourth blocking portion 422c has a rectangular shape or a strip shape in the top view. The rectangular shape or the strip shape has a long axis direction parallel to the first direction. In addition, the first pattern 410c and the second pattern 420c do not overlap with the main spacer 311 and the sub-spacer 312, and at least portions of the first pattern 410c and the second pattern 420c may partially overlap with the via 151, but the present disclosure is not limited thereto. The main spacer 311 is inserted in the first inserting space CS', and the sub-spacer 312 is inserted in the second inserting space CS2. Thereby, it is beneficial to limit the displacement degree of the main spacer 311 and the sub-spacer 312 along the second direction. The materials of the first pattern 410c and the second pattern 420c may include transparent materials. For other details of the electronic device 10c, references may be made to that of the electronic device 10a.

Figure 8:
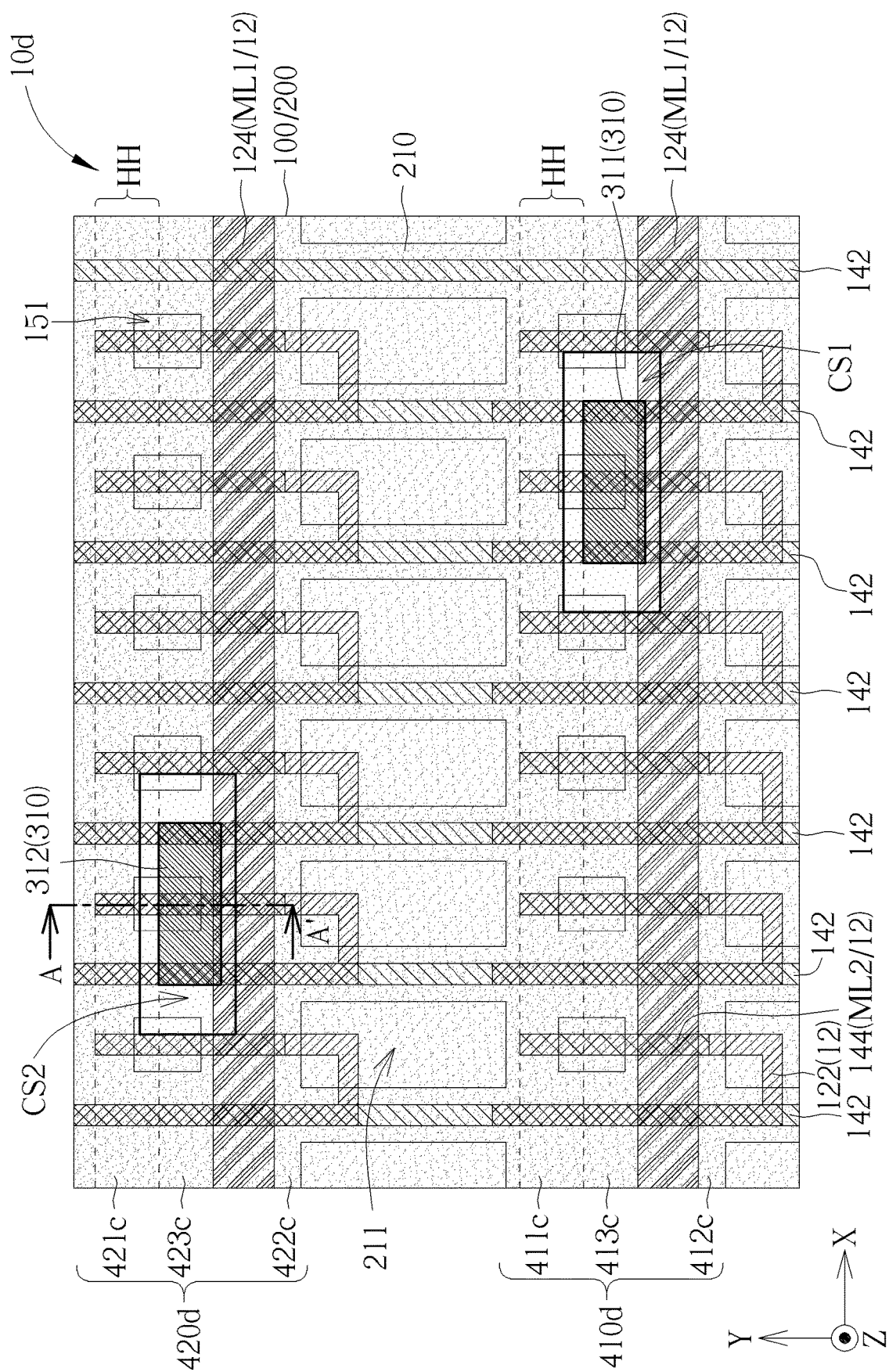
FIG. 8 is a schematic diagram showing a top view of an electronic device according to yet another embodiment of the present disclosure.

Please refer to FIG. 8 which is a schematic diagram showing a tap view of an electronic device 10d according to yet another embodiment of the present disclosure. Since the partial cross-sectional view taken along line A-A' of the electronic device 10d shown in FIG. 8 is identical to that of the electronic device 10c shown in FIG. 7, please refer to FIG. 9 simultaneously. The main difference between the electronic device 10d and the electronic device 10c is the arrangement of the first pattern 410d and the second pattern 420d. The first pattern 410d includes a first blocking portion 421c, a second blocking portion 412c and a first connecting portion 413c, and the first connecting portion 413c is connected between the first blocking portion 411c and the second blocking portion 412c. The second pattern 420c includes a third blocking portion 421c, a fourth blocking portion 422c and a second connecting portion 423c, and the second connecting portion 423c is connected between the third blocking portion 421c and the fourth blocking portion 422c. The first blocking portion 411c, the second blocking portion 412c, and the first connecting portion 413c may be integrally formed on the inner surface M4 of the insulating layer 230 and extend outwardly and parallel to the normal direction, so as to form the first inserting space CS1 between the first blocking portion 411c, the second blocking portion 412c and the first connecting portion 413c. The third blocking portion 421c, the fourth blocking portion 422c and the second connecting portion 423c may be integrally formed on the inner surface M4 of the insulating layer 230 and extend outwardly and parallel to the normal direction, so as to form the second inserting space CS2 between the third blocking portion 421c, the fourth blocking portion 422c and the second connecting portion 423c. Each of the first inserting space CS1 and the second inserting space CS2 has a rectangular shape, an elliptical shape or other suitable shape in the top view, but the present disclosure is not limited thereto. The main spacer 311 is inserted in the first inserting space CS1, and the sub-spacer 312 is inserted in the second inserting space CS2. Thereby, it is beneficial to limit the displacement degree of the main spacer 311 and the sub-spacer 312 along the first direction and the second direction. The materials of the first pattern 410d and the second pattern 420d may include transparent materials. For other details of the electronic device 10d, reference may be made to that of the electronic device 10c.

Figure 10:
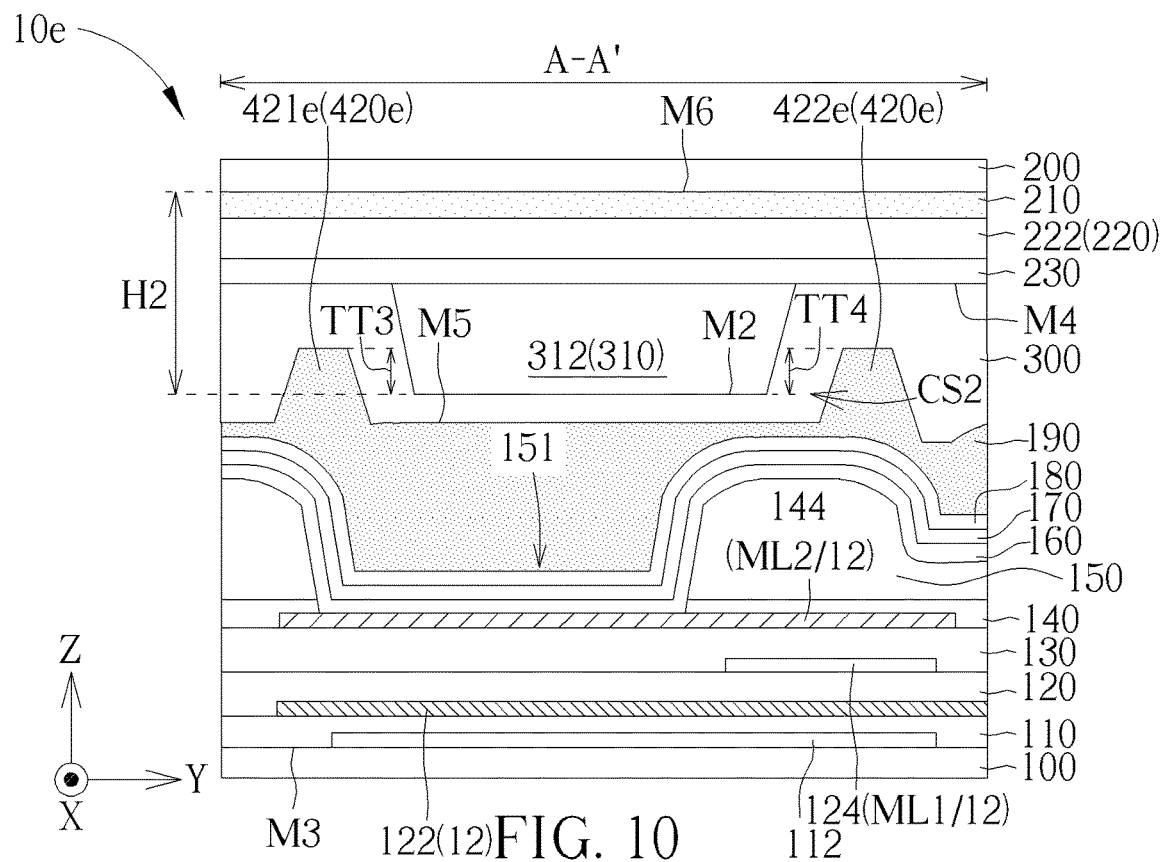
FIG. 10 is a schematic diagram showing a partial cross-sectional view of an electronic device according to yet another embodiment of the present disclosure.

Please refer to FIG. 10, which is a schematic diagram showing a partial cross-sectional view of an electronic device 10e according to yet another embodiment of the present disclosure. The view angle of FIG. 10 is identical to that of FIG. 6. The differences between the electronic device 10e and the electronic device 10a are explained below. The spacer 310 includes a main spacer (not shown) and a sub-spacer 312, the main spacer (not shown) and the sub-spacer 312 are disposed on the inner surface M6 of the opposite substrate 200. Specifically, the main spacer (not shown) and the sub-spacer 312 are disposed on the inner surface M4 of the insulating layer 230. The electronic device 10e further includes an insulating layer 190. The insulating layer 190 is disposed on the insulating layer 150. Specifically, the insulating layer 190 may be disposed on the common electrode 180. In other embodiments, the insulating layer 190 may be disposed under the common electrode 180, such as disposed between the drain 144 and the common electrode 180. A third blocking portion 421e and a fourth blocking portion 422e of the second pattern 420e are integrally formed on the top surface M5 of the insulating layer 190 and extend outwardly and parallel to the normal direction, so as to form a second inserting space CS2 between the third blocking portion 421e and the fourth blocking portion 422e. Similarly, the first blocking portion and the second blocking portion of the first pattern (not shown) are integrally formed on the top surface M5 of the insulating layer 190 and extend outwardly and parallel to the normal direction, so as to form a first inserting space (not shown between the first blocking portion and the second blocking portion. The main spacer is inserted in the first inserting space, and the sub-spacer 312 is inserted in the second inserting space CS2. Thereby, it is beneficial to limit the displacement degree of the main spacer and the sub-spacer 312 along the second direction. In the embodiment, the second height H2 of the sub-spacer 312 is smaller than the first height of the main spacer (not shown). The sub-spacer 312 does not abuts against the top surface M5 of the insulating layer 190, and the main spacer (not shown) abuts against the top surface M5 of the insulating layer 190. In addition, when the spacer 310 is disposed an the opposite substrate 200, the first height may be the maximum distance between the top surface of the main spacer (not shown) and the inner surface M6 of the opposite substrate 200 along the normal direction. The second height H2 may be the maximum distance between the top surface M2 of the sub-spacer 312 and the inner surface M6 of the opposite substrate 200 along the normal direction. In some embodiments, the electronic device 10b of FIG. 5 may further include an insulating layer 190 (refer to FIG. 10), and the insulating layer 190 is disposed on the insulating layer 150. For example, the insulating layer 190 may be disposed on the common electrode 180. The spacer 310 may be changed to be disposed on the inner surface M4 of the insulating layer 230, and the first pattern 410b and the second pattern 420h may be changed to be integrally formed on the top surface M5 of the insulating layer 190 and extend outwardly and parallel to the normal direction. The effect of limiting the displacement degree of the main spacer 311 and the sub-spacer 312 along the first direction and the second direction can be achieved, too. In some embodiments, the electronic device 10c shown in FIG. 7 may further include an insulating layer 190 (refer to FIG. 10). The insulating layer 190 is disposed on the insulating layer 150. For example, the insulating layer 190 may be disposed on the common electrode 180, the spacer 310 may be changed to be disposed on the inner surface MA of the insulating layer 230, and the first pattern 410c and the second pattern 420c shown in FIG. 7 may be changed to integrally formed on the top surface M5 of the insulating layer 190 and extend outwardly and parallel to the normal direction. The effect of limiting the displacement degree of the main spacer 311 and the sub-spacer 312 along the second direction can be achieved, too. In some embodiments, the electronic device 10d shown in FIG. 8 may further include an insulating layer 190 (refer to FIG. 10). The insulating layer 190 is disposed on the insulating layer 150. For example, the insulating layer 190 may be disposed on the common electrode 180, the spacer 310 can be changed to be disposed on the inner surface M4 of the insulating layer 230 and the first pattern 410d and the second pattern 420d may be changed to integrally formed on the top surface M5 of the insulating layer 190 and extend outwardly and parallel to the normal direction. The effect of limiting the displacement degree of the main spacer 311 and the sub-spacer 312 along the first direction and the second direction can be achieved, too.

With the arrangement of the electronic devices 10a, 10b, 10c, 10d and 10e, when the electronic devices 10a, 10b, 10c, 10d and 10 are applied as liquid crystal display devices, the probability of the spacer 310 scratching the alignment film can be reduced, and the loss of the opening rate caused by the offset when assembling the substrate 100 and the opposite substrate 200 can also be reduced. With the arrangement of the electronic devices 10b and 10d, the assembling accuracy along the first direction and the second direction can be further controlled. According to the electronic devices 10a, 10b, 10c, 10d and 10e, the first patterns 410a, 410b, 410c and 410d and the second patterns 420a, 420b, 420c, 420d and 420e may be formed on the existing layers (such as the insulating layer 230 and the insulating layer 190). Thereby, it is beneficial to simplify the manufacturing process of the first patterns 410a, 410b, 410c and 410d and the second patterns 420a, 420b, 420c, 420d and 420e.

Figure 11:
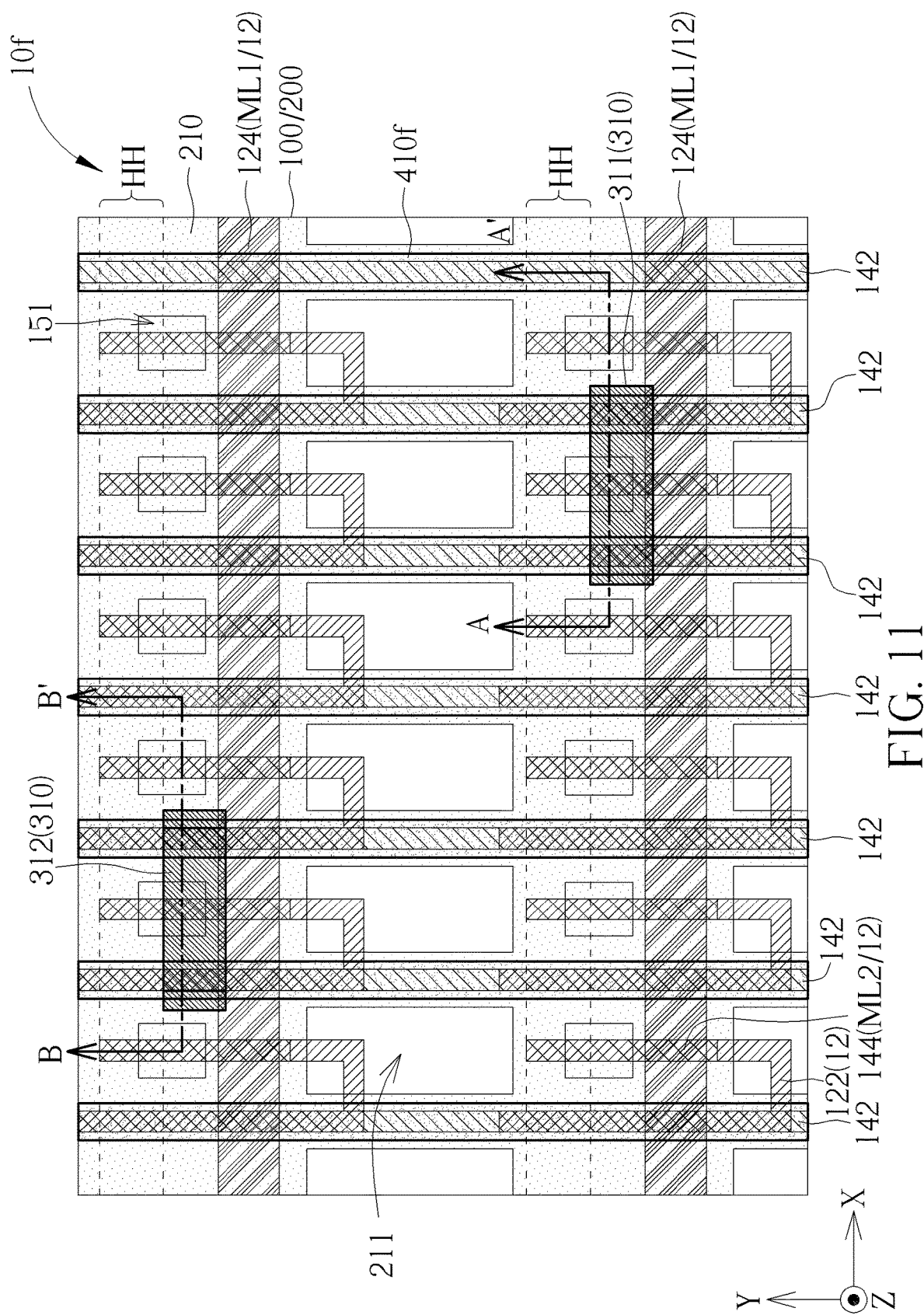
FIG. 11 is a schematic diagram showing a top view of an electronic device according to yet another embodiment of the present disclosure.
Figure 12:
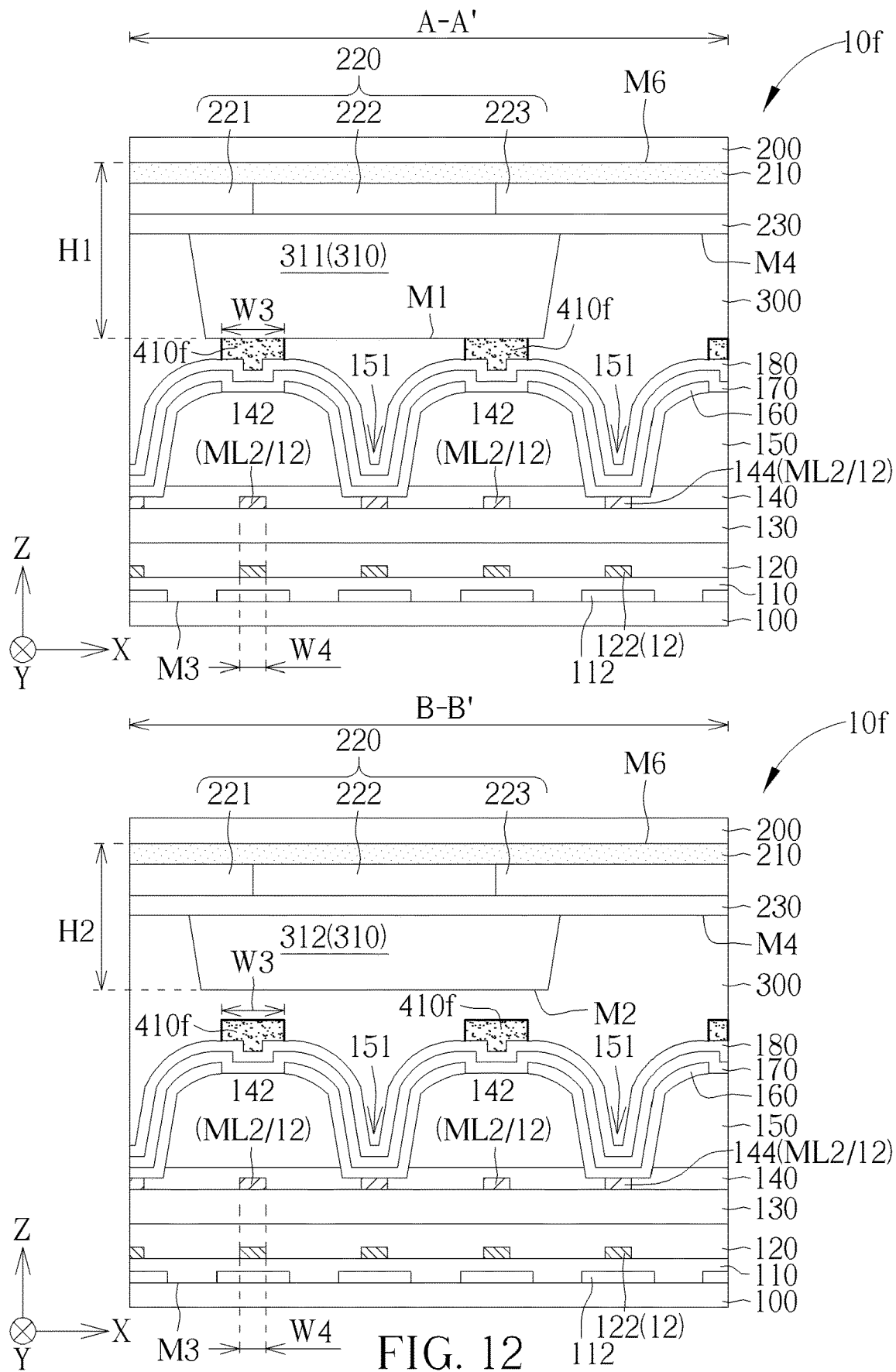
FIG. 12 is a schematic diagram showing partial cross-sectional views taken along line A-A' and line B-B' of the electronic device shown in FIG. 11.

Please refer to FIG. 11 and FIG. 12. FIG. 11 is a schematic diagram showing a top view of an electronic device 10f according to yet another embodiment of the present disclosure, and FIG. 12 is a schematic diagram showing partial cross-sectional views taken along line A-A' and line B-B' of the electronic device 10f shown in FIG. 11. As shown in FIG. 11 and FIG. 12, the data line 142 is disposed on the substrate 100 and has an extending direction (such as the direction parallel to the direction Y). The spacer 310 is disposed between the substrate 100 and the opposite substrate 200, the first pattern 410f is disposed between the data line 142 and the spacer 310 and extends along the extending direction, wherein the first pattern 410f overlaps with the data line 142. In the embodiment, the spacer 310 is disposed on the inner surface M6 of the opposite substrate 200. Specifically, the spacer 310 is disposed an the inner surface M4 of the insulating layer 230. The spacer 310 includes a main spacer 311 and a sub-spacer 312. The main spacer 311 has a first height H1, the sub-spacer 312 has a second height H2, and the first height H1 is greater than the second height H2. Each of the data lines 142 is correspondingly disposed with the first pattern 410f, wherein the main spacer 311 abuts against the first pattern 410f, and the sub-spacer 312 does not abut against the first pattern 410f. However, the present disclosure is not limited thereto. In some embodiments, the first height H1 of the main spacer 311 may be equal to the second height H2 of the sub-spacer 312, the data line 142 corresponding to the main spacer 311 may be disposed with the first pattern 410f, so that the main spacer 311 abuts against the first pattern 410f, while the data line 142 corresponding to the sub-spacer 312 is not disposed with the first pattern 410f, so that the sub-spacer 312 does not abut against the first pattern 410f. That is, there may be a spaced distance between the sub-spacer 312 and the common electrode 180. With the first height H1 being equal to the second height H2, it is beneficial to simplify the manufacturing process of the spacer 310. In the embodiment, the first pattern 410f has a rectangular shape or a strip shape in the top view and extends along the extending direction of the data line 142, but not limited thereto. The first pattern 410f is staggered with the opening 211 and does not overlap with the opening 211. When the electronic device 10f is applied as a liquid crystal display device, with the first pattern 410f, it is beneficial to reduce the probability of scratching the alignment film corresponding to the opening 211 caused by the shift of the spacer 310. Accordingly, the light shielding range corresponding to the spacer 310 can be reduced, which is beneficial to maintain the opening rate. The first pattern 410f has a width W3 along the first direction. In some embodiments, the width W3 may be less than 10 µm, and no alignment film is formed on the first pattern 410f, which can prevent the spacer 310 from scratching the alignment film, but not limited thereto. The materials of the first pattern 410f may include conductive materials with low reflectivity, such as molybdenum (Mo), titanium (Ti) chromium (Cry or oxides thereof. Alternatively, the materials of the first pattern 410f may include transparent conductive materials (such as ITO). When the materials of the first pattern 410f include the conductive materials, the electrical properties of the common electrode 180 can be improved by the electrical connection between the first pattern 410f and the common electrode 180. In some embodiments, the materials of the first pattern 410f may also include non-conductive materials, such as a silicon nitride (SiNx), a silicon oxide (SiOx) or a photoresist material, which can reduce the influence on the electric field of the pixel. In addition, when the materials of the first pattern 410f include transparent materials, it is beneficial to reduce the loss of the opening rate caused by the process variation. When the materials of the first pattern 410f include non-transparent materials, it is beneficial to shield the reflection of the metals (such as the data line 142). In the embodiment, the data line 142 has a width W4 along the first direction, and the width W3 is greater than the width W4, meanwhile the material of the first pattern 410 includes the non-transparent materials. Thereby, which is beneficial to shield the metal reflection of the data line 142, and a better shielding and color mixing effect can be provided. In some embodiments, the width W3 may be smaller than the width W4, which is beneficial to reduce the influence on the alignment of the liquid crystal in the display area. The aforementioned width W3 may be the distance between the left edge and the right edge of the first pattern 410f along the first direction, and the aforementioned width W4 may be the distance between the left edge and the right edge of the data line 142 along the first direction.

Figure 13:
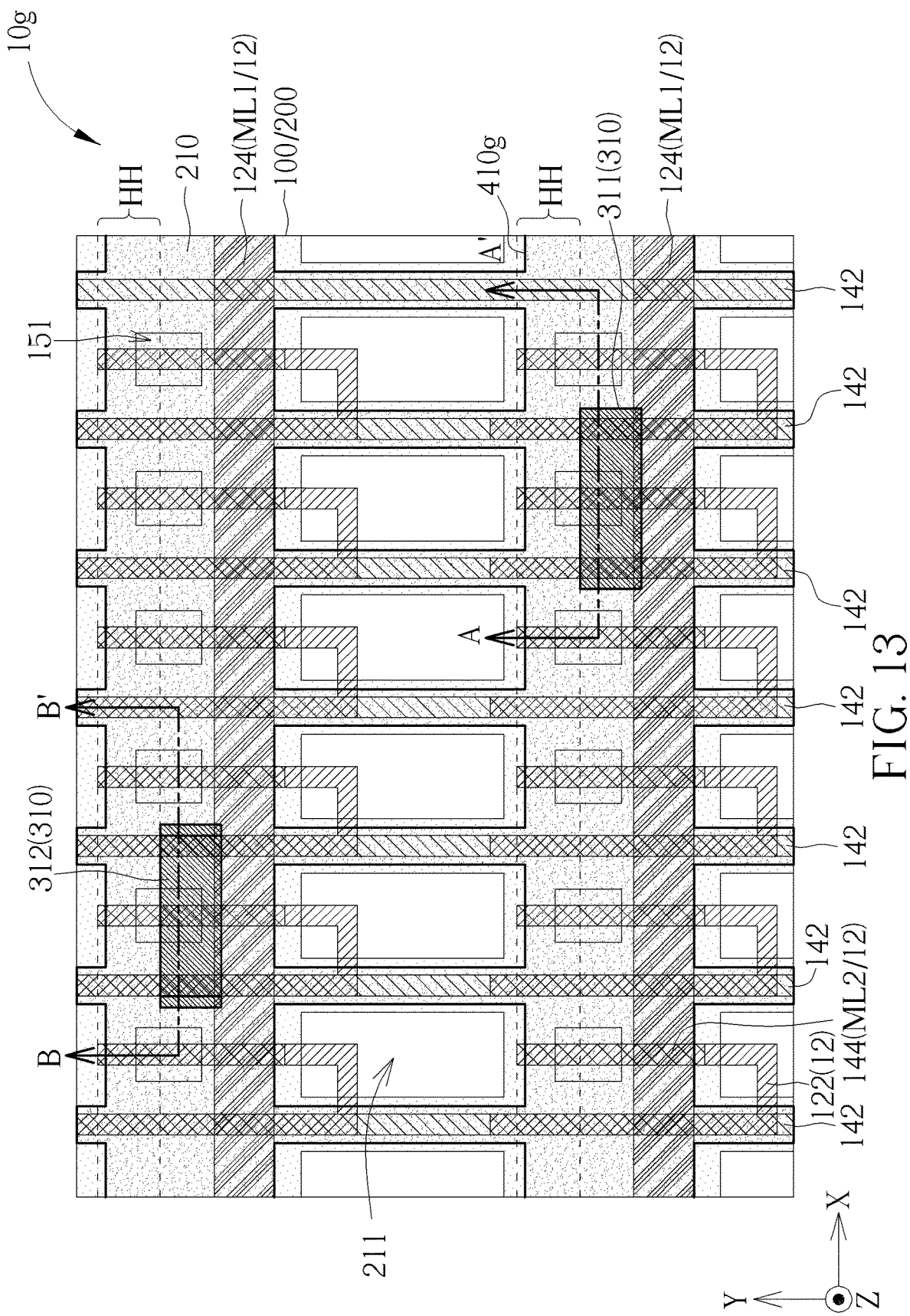
FIG. 13 is a schematic diagram showing a top view f an electronic device according to yet another embodiment of the present disclosure.
Figure 14:
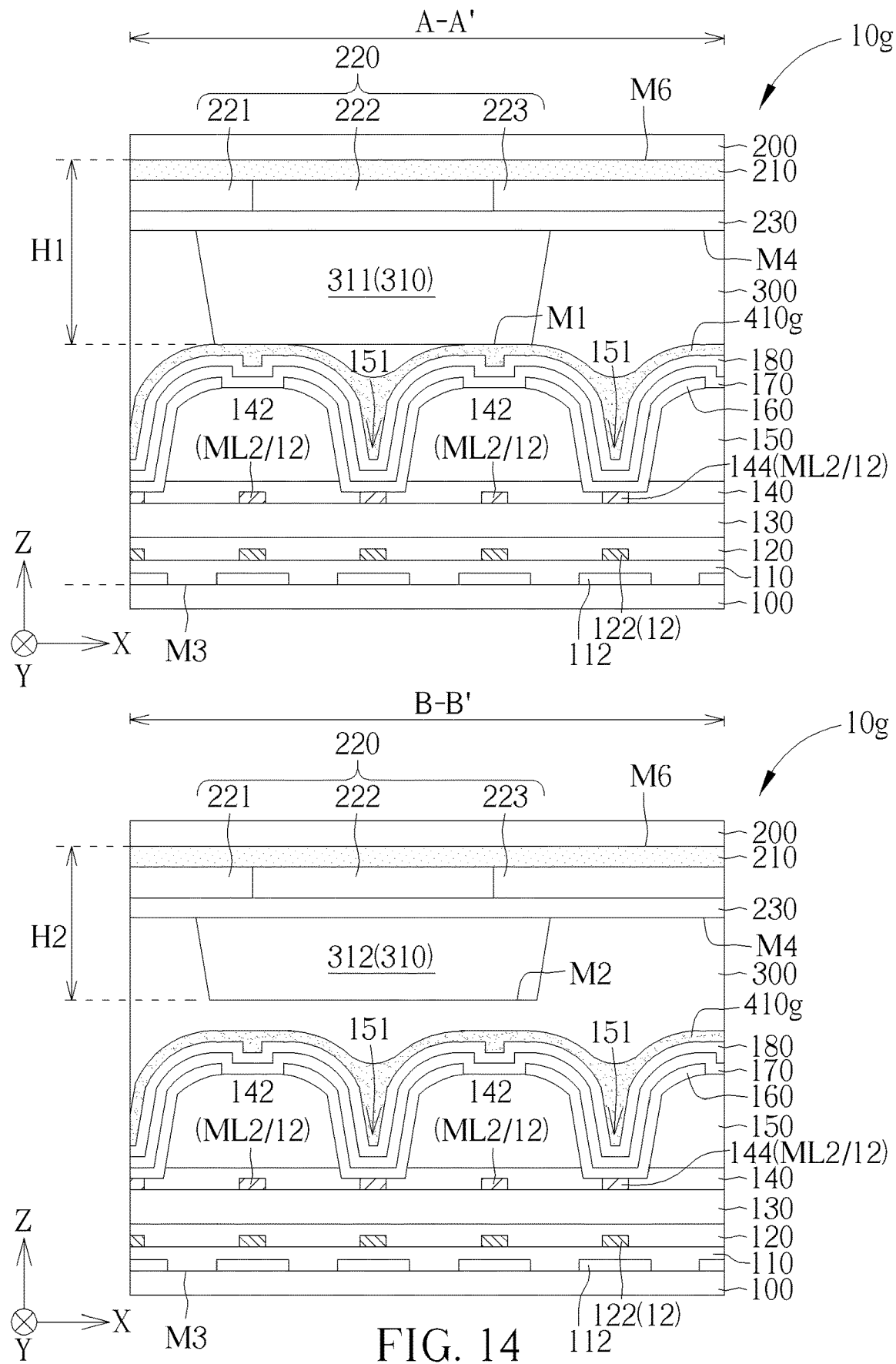
FIG. 14 is a schematic diagram showing partial cross-sectional views taken along line A-A' and line B-B' of the electronic device shown in FIG. 13.

Please refer to FIG. 13 and FIG. 14. FIG. 13 is a schematic diagram showing a top view of an electronic device 10g according to yet another embodiment of the present disclosure. FIG. 14 is a schematic diagram showing partial cross-sectional views taken along line A-A' and line 13-B' of the electronic device 10g shown in FIG. 13. The main difference between the electronic device 10g and the electronic device 10f is the arrangement of the first pattern 410g of the electronic device 10g. Similar to that of the electronic device 10f, the data line 142 is disposed on the substrate 100 and has an extending direction (such as a direction parallel to the direction Y). The spacer 310 is disposed between the substrate 100 and the opposite substrate 200. The first pattern 410g is disposed between the data line 142 and the spacer 310 and extending along the extending direction. The first pattern 410g overlaps with the data line 142. The electronic device 10g may further include gate lines 124 disposed on the substrate 100, wherein the gate lines 124 intersects with the data lines 142, and the gate lines 124 overlap with the first pattern 410g. In the embodiment, the data line 142 has an extending direction (such as a direction parallel to the direction Y), the gate line 124 has an extending direction (such as a direction parallel to the direction X) perpendicular to the extending direction of the data line 142. The first pattern 410g extends along the extending direction of the data line 142 and the extending direction of the gate line 124, and the first pattern 410g overlaps with the data line 142 and the gate line 124 at the same time. In the embodiment, the first pattern 410g and the opening 211 are staggered and do not overlap with each other. In the embodiment, the spacer 310 is disposed on the inner surface M4 of the insulating layer 230. The spacer 310 includes a main spacer 311 and a sub-spacer 312. The main spacer 311 has a first height H1, the sub-spacer 312 has a second height H2, and the first height H1 is greater than the second height H2. The main spacer 311 abuts against the first pattern 410g, and the sub-spacer 312 does not abut against the first pattern 410g. However, the present disclosure is not limited thereto. In some embodiments, the first height H1 of the main spacer 311 may be equal to the second height H2 of the sub-spacer 312, the first pattern, 410g is disposed between the data line 142 and the main spacer 311, and the first pattern 410g is not disposed between the data line 142 and the sub-spacer 312, so that the main spacer 311 abuts against the first pattern 410g, and the sub-spacer 312 does not abut against the first pattern 410g. That is, there may be a spaced distance between the sub-spacer 312 and the common electrode 180. With the first height H1 being equal to the second height H2, it is beneficial to simplify the manufacturing process of the spacer 310.)

Figure 15:
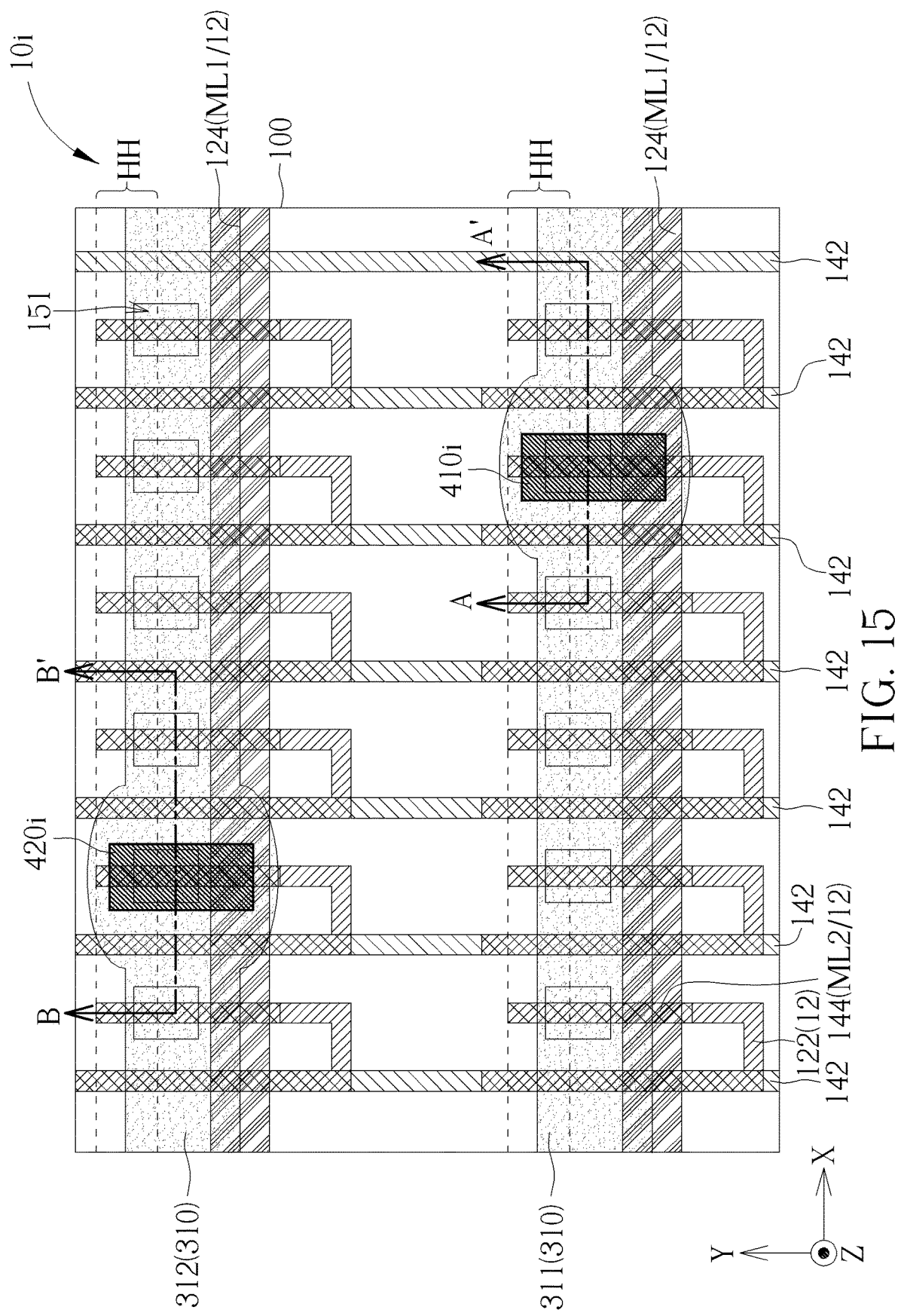
FIG. 15 is a schematic diagram showing a top view of an electronic device according to yet another embodiment of the present disclosure.
Figure 16:
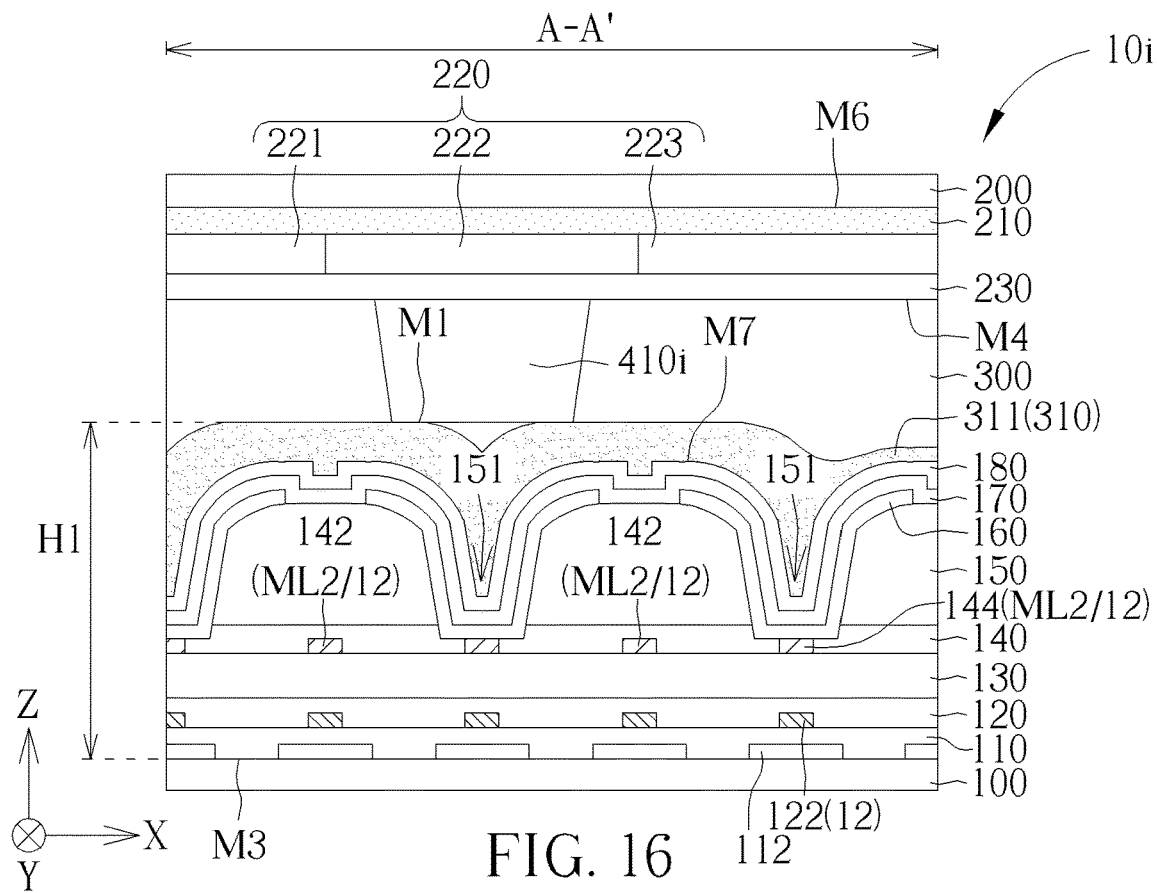
FIG. 16 is a schematic diagram showing a partial cross-sectional view taken along line A-A' of the electronic device shown in FIG. 15.
Figure 17:
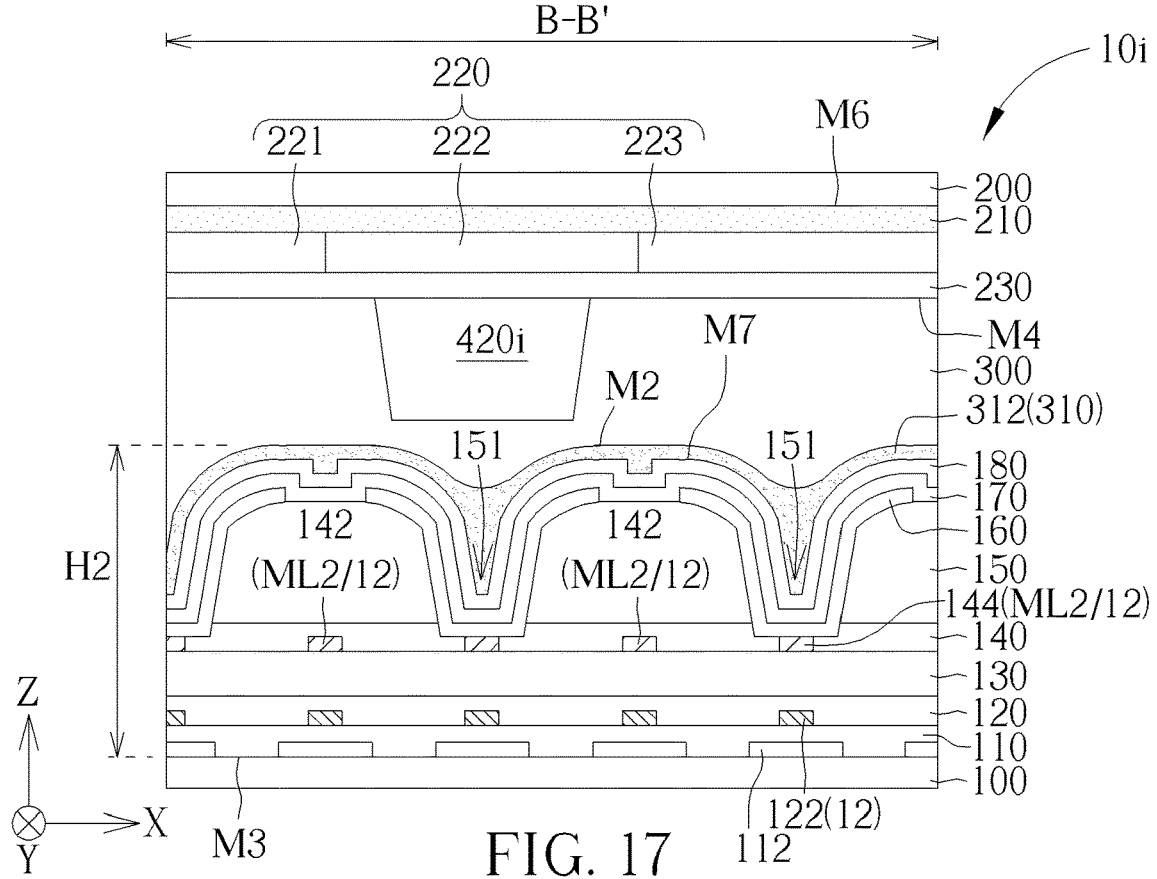
FIG. 17 is a schematic diagram showing a partial cross-sectional view taken along line B-B' of the electronic device shown in FIG. 15.

Please refer to FIG. 15, FIG. 16 and FIG. 17. FIG. 15 is a schematic diagram showing a top view of an electronic device 10i according to yet another embodiment of the present disclosure, FIG. 16 is a schematic diagram showing a partial cross-sectional view taken along line A-A' of the electronic device 10i shown in, FIG. 15, and FIG. 17 is a schematic diagram showing a partial cross-sectional view taken along line B-B' of the electronic device 101 shown in FIG. 15. Compared with FIG. 1, the light shielding layer 210 on the opposite substrate 200 is further omitted in FIG. 15 for the sake of simplification. The electronic device 101 includes a first pattern 410i and a second pattern 420i. As shown in FIG. 15, the first pattern 410i has a long axis direction parallel to the second direction (such as the direction Y), and the first pattern 410i overlaps with the gate line 124 (the gate line 124 at the lower position of FIG. 15). Specifically, the first pattern 410i has a rectangular shape in the top view, wherein the long axis direction is corresponding to the long side direction of the rectangular shape and is perpendicular to the extending direction of the gate line 124. The second pattern 420i has a long axis direction parallel to the second direction, and the second pattern 420i overlaps with the gate line 124 (the gate line 124 at the upper position of FIG. 15). Specifically, the second pattern 420i has a rectangular shape in the top view, wherein the long axis direction is corresponding to the long side direction of the rectangular shape and is perpendicular to the extending direction of the gate line 124. In the embodiment, the spacer 310 includes a main, spacer 311 and a sub-spacer 312. The main spacer 311 has a long axis direction parallel to the first direction (such as the direction X), and the main spacer 311 overlaps with the gate line 124 (the gate line 124 at the lower position in FIG. 15). The sub-spacer 312 has a long axis direction parallel to the first direction, and the sub-spacer 312 overlaps with the gate line 124 (the gate line 124 at the upper position of FIG. 15). Specifically, each of the main spacer 311 and the sub-spacer 312 have a strip shape in the top view, and a long axis direction of the strip shape is parallel to the first direction. In addition, the length of each of the main spacer 311 and the sub-spacer 312 along the second direction (such as the direction Y) may vary. For example, the portion of the main spacer 311 corresponding to the first pattern 410i may have a longer length, and the portion of the sub-spacer 312 corresponding to the second pattern 420i may have a longer length, but the present disclosure is not limited thereto. The main spacer 311 and the sub-spacer 312 may overlap with a plurality of vias 151. Herein, each of the main spacer 311 and the sub-spacer 312 is exemplarily filled in at least one via 151, which can reduce light leakage and improve display contrast. As shown in FIG. 16 and FIG. 17, the main spacer 311 and the sub-spacer 312 are disposed on the top surface M7 of the common electrode 180. The main spacer 311 has a first height H1, the sub-spacer 312 has a second height H2, and the first height H1 is greater than the second height H2. The first pattern 410i overlaps with the main spacer 311, and the second pattern 420*i* overlaps with the sub-spacer 312. The first pattern 410*i* abuts against the main spacer 311, and the second pattern 420*i* does not abut against the sub-spacer 312.

Figure 18:
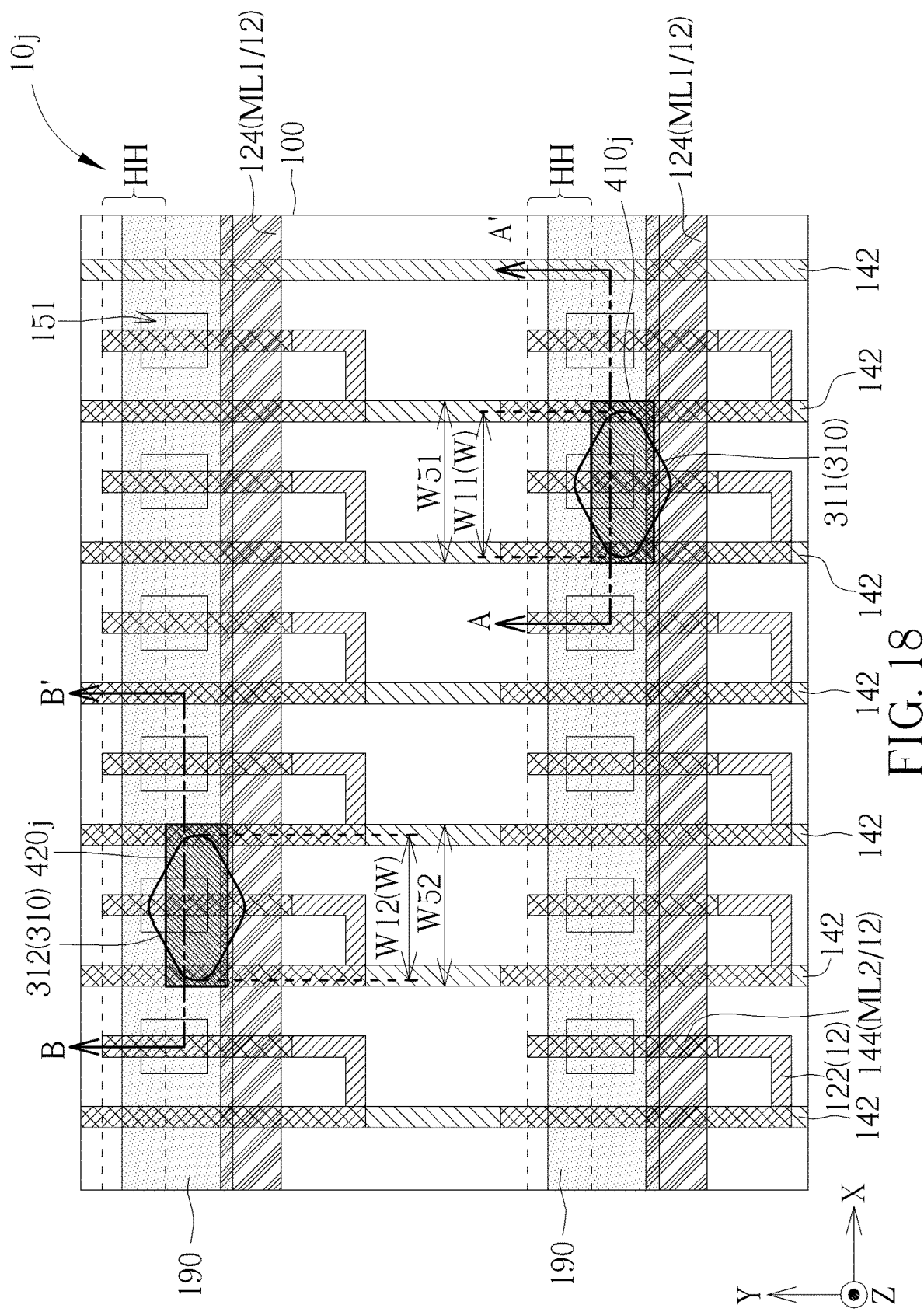
FIG. 18 is a schematic diagram showing a top view of an electronic device according to yet another embodiment of the present disclosure.
Figure 19:
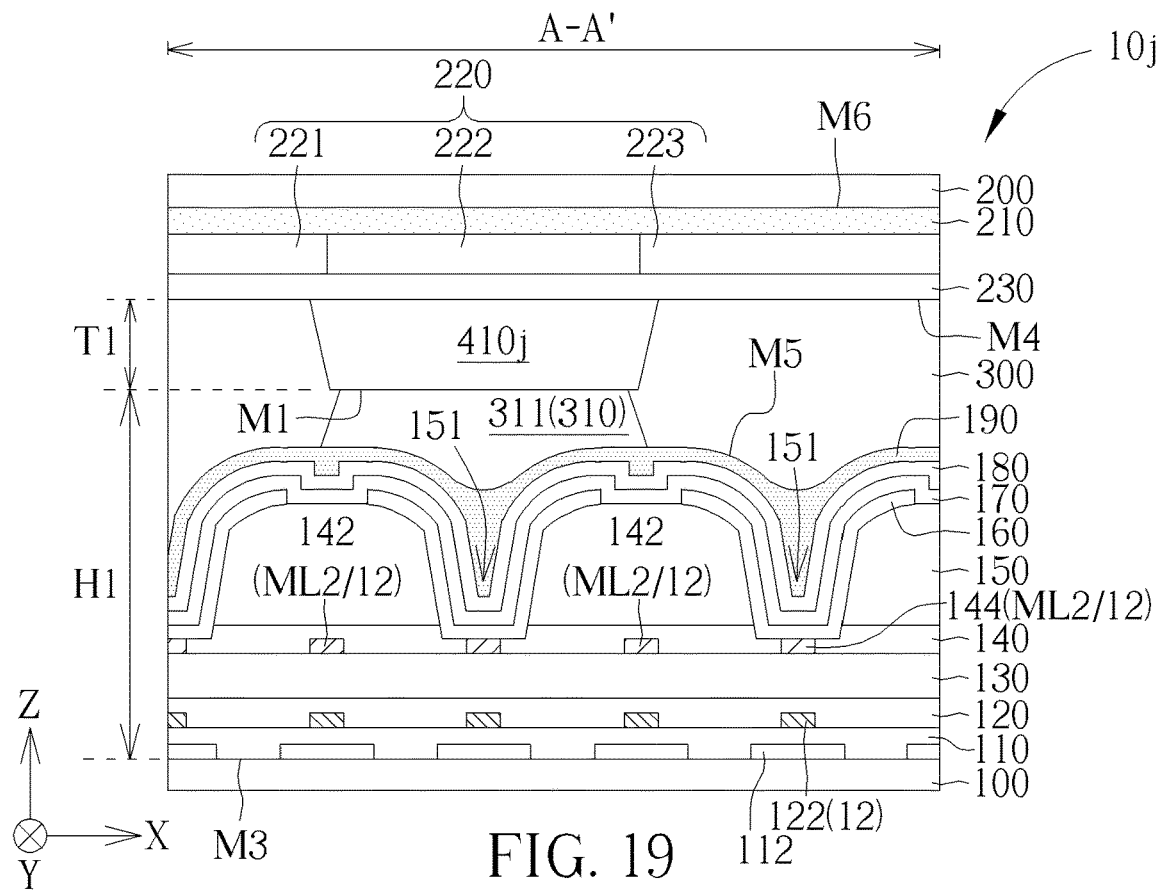
FIG. 19 schematic diagram showing a partial cross-sectional view taken along line A-A' of the electronic device shown in FIG. 18.
Figure 20:
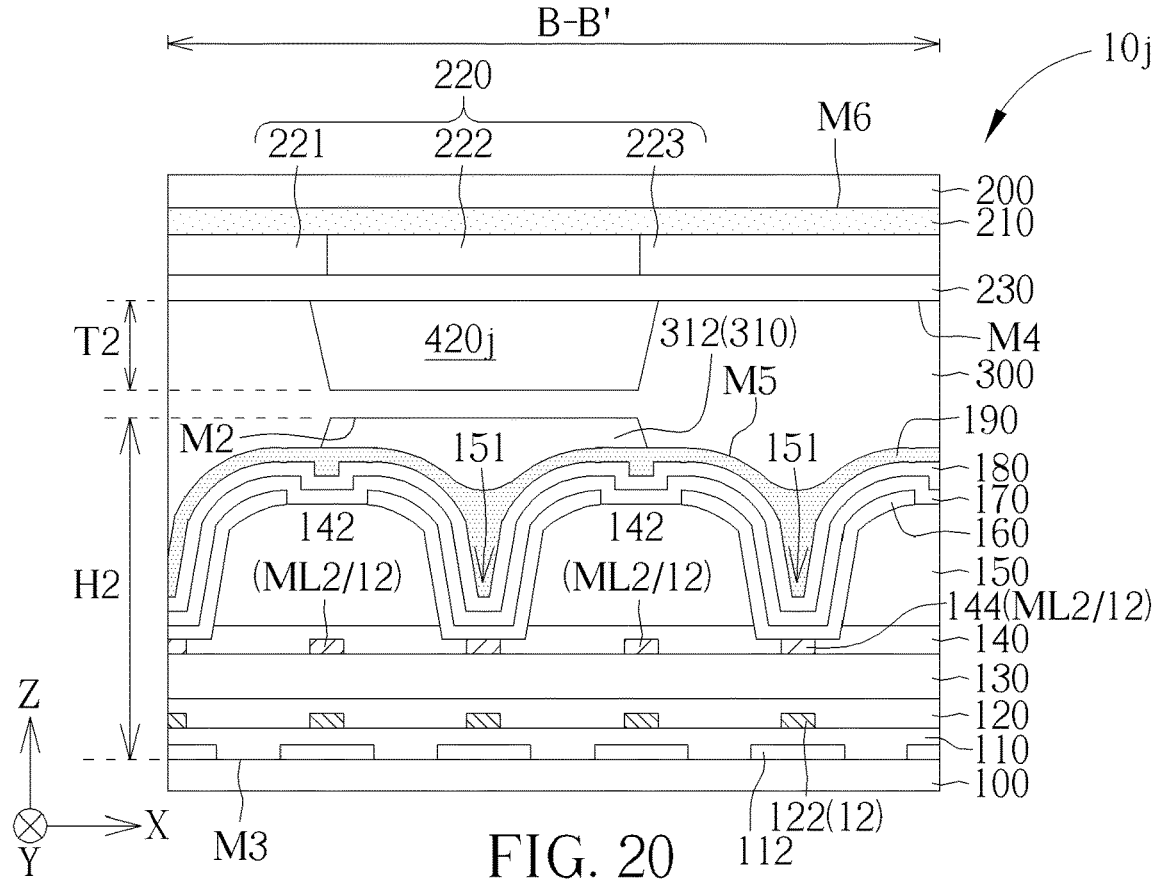
FIG. 20 is a schematic diagram showing a partial cross-sectional view taken along line B-B' of the electronic device shown in FIG. 18.

Please refer to FIG. 18, FIG. 19 and FIG. 20, FIG. 18 is a schematic diagram showing a top view of an electronic device 10*j* according to yet another embodiment of the present disclosure, FIG. 19 is a schematic diagram showing a partial cross-sectional view taken along line A-A' of the electronic device 10*j* shown in, FIG. 1*e*, and FIG. 20 is a schematic diagram showing a partial cross-sectional view taken along line B-B' of the electronic device 101 shown in FIG. 18. The electronic device 10*j* includes an insulating layer 190. The insulating layer 190 is disposed on the insulating layer 150, wherein the spacer 310 overlaps with the insulating layer 190. In other words, at least a portion of the insulating layer 190 may be disposed between the spacer 310 and the insulating layer 150. Herein, an extending direction of the insulating layer 190 is parallel to an extending direction of the gate line 124, both of which are parallel to the first direction (such as the direction X). The insulating layer 190 has a rectangular shape or a strip shape in the top view, and a long axis direction of the rectangular shape or the strip shape is parallel to the first direction, but the present disclosure is not limited thereto. In some embodiments, a length of the insulating layer 190 along the second direction (such as the direction Y) may vary. For example, the portion of the insulating layer 190 corresponding to the spacer 310, the first pattern 410*i* or the second pattern 420*j* may have a longer length. For example, the shape of the insulating layer 190 may be similar to the shapes of the main spacer 311 and the sub-spacer 312 in FIG. 15. The insulating layer 190 overlaps with a plurality of vias 151. In other words, at least a portion of the insulating layer 190 may be disposed in the vias 151. Herein, the insulating layer 190 is entirely filled in the via 151, which is exemplary. Thereby, light leakage can be reduced and the display contrast can be improved. The electronic device 101 may further include a first pattern 410*j*. The spacer 310 is disposed between the first pattern 410*i* and the insulating layer 190. The electronic device 101 may further include a second pattern 420*j*. The spacer 310 is disposed between the second pattern 420*j* and the insulating layer 190. The first pattern 410*j* has a width W51 along the first direction. The width W51 and the sub-pixel pitch P may satisfy the following relationships P≤W51<3×P. The second pattern 420*j* has a width W52 along the first direction. The width W52 and the sub-pixel pitch P may satisfy the following relationship: P≤W52<3×P. Specifically, in the embodiment, the spacer 310 is disposed an the top surface M5 of the insulating layer 190. The spacer 310 includes a main spacer 311 and a sub-spacer 312. The width W11 of the main spacer 311 and the sub-pixel pitch P may satisfy the following relationship: P≤W11<3×P. The width W12 of the sub-spacer 312 and the sub-pixel pitch P may satisfy the following relationship: P≤W12<3×P. The main spacer 311 has a first height H1, the sub-spacer 312 has a second height H2, and the first height H1 is greater than the second height H2. The main spacer 311 is disposed between the first pattern 410*j* and the insulating layer 150, and the sub-spacer 312 is disposed between the second pattern 420*j* and the insulating layer 190. The first pattern 410*j* has a first thickness T1, the second pattern 420*j* has a second thickness T2, and the first thickness T1 is equal to the second thickness T2. The first pattern 410*j* abuts against the main spacer 311, and the second pattern 420*j* does not abut against the sub-spacer 312. Herein, the first thickness T1 may be the protruding length or protruding height of the first pattern 410*j* along the normal direction. For example, the first thickness T1 may be the maximum protruding height of the first pattern 410*i* relative to the inner surface M4 of the insulating layer 230 along the normal direction. The second thickness T2 may be the protruding length or protruding height of the second pattern 420*j* along the normal direction. For example, the second thickness T2 may be the maximum protruding height of the second pattern 420*j* relative to the inner surface MA of the insulating layer 230 along the normal direction. However, the present disclosure is not limited thereto. In some embodiments, the first height H1 may be equal to the second height H2, and the first thickness T1 may be greater than the second thickness T2, so that the first pattern 410*j* abuts against the main spacer 311, and the second pattern 420*j* does not abut against the sub-spacer 312.

In the present disclosure, the spacer may be an island or a portion with a larger thickness or height in a layer. The materials of the spacer may include organic materials (such as photoresist materials) or metal materials.

In the present disclosure, the opening rate may be calculated as follows: the opening rate=(area of the opening 211/area of the sub-pixel 11)×100%.

According to the present disclosure, with the first pattern abutting against the main spacer, it is beneficial to reduce the height of the main spacer. Alternatively, with the first pattern and the second pattern forming the inserting space for the main spacer and the sub-spacer being inserted therein, it is beneficial to limit the displacement degree of the main spacer and the sub-spacer along the first direction and/or the second direction, which is beneficial to reduce the requirement of increasing the light shielding range caused by the offset when assembling the substrate and the opposite substrate. When the electronic device is applied as a liquid crystal display device, it can reduce the probability of scratching the alignment film, the alignment film halo and the range of poor alignment, which is beneficial to maintain the opening rate and the applications of high-resolution display devices.

Those skilled in the art will readily observe that numerous modifications and alterations of the device and method may be made while retaining the teachings of the disclosure. Accordingly, the above disclosure should be construed as limited only by the metes and bounds of the appended claim.

What is claimed is:

1. An electronic device having a plurality of sub-pixels, the electronic device comprising:
   a substrate;
   a gate line disposed on the substrate and extending along a first direction;
   a spacer disposed on the gate line and overlapping with the gate line, wherein the spacer has a first width W1 along the first direction;
   an opposite substrate disposed corresponding to the substrate, wherein the spacer comprises a main spacer and a sub-spacer, the main spacer and the sub-spacer are disposed on the substrate and located between the substrate and the opposite substrate, the main spacer has a first height, the sub-spacer has a second height, and the first height is greater than the second height;
   a first pattern disposed between the opposite substrate and the main spacer; and
   a second pattern disposed between the opposite substrate and the sub-spacer;

wherein one of the plurality of sub-pixels has a sub-pixel pitch P along the first direction, and the first width W1 and the sub-pixel pitch P satisfy the following relationship: P≤W1; and wherein the first pattern has a first thickness, the second pattern has a second thickness, and the first thickness is equal to the second thickness.

2. The electronic device of claim 1, wherein the first width W1 and the sub-pixel pitch P satisfy the following relationship: P≤W1<3×P.

3. The electronic device of claim 1, further comprising:
a color filter layer disposed between the first pattern and the opposite substrate.

4. The electronic device of claim 1, wherein a first distance is between the main spacer and the first pattern, a second distance is between the sub-spacer and the second pattern, and the first distance is less than the second distance.

5. The electronic device of claim 1, wherein the main spacer has a long axis direction parallel to the first direction, and the main spacer overlaps with the gate line.

6. The electronic device of claim 5, wherein the main spacer has a second width W2 along a second direction perpendicular to the first direction, the first pattern has a protruding distance PD relative to the main spacer along the second direction, and the second width W2 and the protruding distance PD satisfy the following relationship: PD>0.05×W2.

7. The electronic device of claim 1, wherein the first pattern has a first area Al, the first pattern and the main spacer have an overlapping area AA, and the first area Al and the overlapping area AA satisfy the following relationship: AA>0.05×A1.

8. The electronic device of claim 1, wherein the electronic device comprises a virtual reality electronic device.

9. An electronic device having a plurality of sub-pixels, the electronic device comprising:
a substrate;
a gate line disposed on the substrate and extending along a first direction;
a spacer disposed on the gate line and overlapping with the gate line, wherein the spacer has a first width W1 along the first direction;
an opposite substrate disposed corresponding to the substrate, wherein the spacer comprises a main spacer and a sub-spacer, the main spacer and the sub-spacer are disposed on one of the substrate and the opposite substrate and located between the substrate and the opposite substrate, the main spacer has a first height, the sub-spacer has a second height, and the first height is greater than the second height;
a first pattern disposed on another one of the substrate and the opposite substrate and located between the substrate and the opposite substrate, wherein the first pattern is formed with a first inserting space concaved from a surface thereof, and the main spacer is inserted in the first inserting space; and
a second pattern disposed on the another one of the substrate and the opposite substrate and located between the substrate and the opposite substrate, wherein the second pattern is formed with a second inserting space concaved from a surface thereof, and the sub-spacer is inserted in the second inserting space;
wherein one of the plurality of sub-pixels has a sub-pixel pitch P along the first direction, and the first width W1 and the sub-pixel pitch P satisfy the following relationship: P≤W1.

10. The electronic device of claim 9, wherein the first pattern comprises a first blocking portion and a second blocking portion, the first blocking portion and the second blocking portion extend along the first direction, and the first inserting space is formed between the first blocking portion and the second blocking portion.

11. The electronic device of claim 10, wherein the first pattern is integrally connected with the second pattern.

12. The electronic device of claim 10, wherein the first pattern further comprises a first connecting portion, the first connecting portion connects the first blocking portion and the second blocking portion along a second direction, and the first inserting space is formed between the first blocking portion, the second blocking portion and the first connecting portion.

13. The electronic device of claim 12, wherein the first pattern is integrally connected with the second pattern.

14. The electronic device of claim 1, further comprising:
a driving element disposed on the substrate;
a first insulating layer disposed on the driving element, wherein the first insulating layer has a via; and
a pixel electrode disposed on the first insulating layer;
wherein the pixel electrode is electrically connected with the driving element through the via.

15. The electronic device of claim 14, further comprising:
a second insulating layer disposed on the first insulating layer, wherein at least one portion of the second insulating layer is disposed in the via, and the at least one portion of the second insulating layer is disposed between the spacer and the first insulating layer.

16. The electronic device of claim 15, further comprising:
a first pattern, wherein the spacer is disposed between the first pattern and the second insulating layer.

17. The electronic device of claim 1, wherein the first pattern and the second pattern are spaced apart from each other.

18. The electronic device of claim 1, wherein the main spacer and the sub-spacer are spaced apart from each other.

* * * * *